(12) United States Patent
Goto et al.

(10) Patent No.: US 6,237,185 B1
(45) Date of Patent: May 29, 2001

(54) WIPER DEVICE FOR VEHICLE

(75) Inventors: Masami Goto; Toshio Kobayashi; Hiroshi Oosaki, all of Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/174,539

(22) Filed: Oct. 19, 1998

(30) Foreign Application Priority Data

Oct. 22, 1997 (JP) .................................................... 9-289851
Oct. 22, 1997 (JP) .................................................... 9-289853
Oct. 22, 1997 (JP) .................................................... 9-289858

(51) Int. Cl.$^7$ ................................. B60S 1/16; B60S 1/06
(52) U.S. Cl. ................. 15/250.31; 15/250.3; 296/96.17; 403/DIG. 3; 74/42
(58) Field of Search .............................. 15/250.3, 250.31, 15/250.34, 250.16; 74/42, 43; 29/426.4; 403/DIG. 3, DIG. 4; 296/96.17

(56) References Cited

U.S. PATENT DOCUMENTS 3,843,194 * 10/1974 Yamada .............................. 15/250.16
4,935,983 * 6/1990 Yamamoto et al. .............. 15/250.16

* cited by examiner

Primary Examiner—Gary K. Graham
(74) Attorney, Agent, or Firm—Foley & Lardner

(57) ABSTRACT

A wiper device for a vehicle disclosed herein is provided with a wiper motor, a wiper pivot connected to the wiper motor, and a load absorption portion for absorbing a load by moving the wiper pivot to an inner side of a vehicle body when a load having a value equal to or more than a predetermined value acts on the wiper pivot. In this case, the wiper pivot can rotate around the pivot axis thereof by using a drive force from the wiper motor, and the wiper pivot extends so as to project toward an outer side of the vehicle body. In accordance with the structure mentioned above, when the load downward due to a collision or the like acts on the rear distal portion of the hood member corresponding to the engine hood, a deformation of the rear distal portion of the hood member toward the lower side is substantially made free by means of the wiper pivot.

4 Claims, 22 Drawing Sheets

WIPER DEVICE FOR VEHICLE

The contents of Application No. TOKUGANHEI 9-289851, with a filling date of Oct. 22, 1997, No. TOKUGANHEI 9-289853, with a filling date of Oct. 22, 1997, and No. TOKUGANHEI 9-289858, with a filling date of Oct. 22, 1997, in Japan are hereby incorporated by reference.

BACKGROUND OF THE INVENTION

1. Field of the Invention

The present invention relates to a wiper device for a vehicle, and particularly to a wiper device for a vehicle preferably usable for a vehicle of a so-called concealed wiper type in which an upper portion of its wiper unit is covered with a rear distal portion of an engine hood of the vehicle.

2. Description of the Related Art

In the vehicle of the concealed wiper type, the rear distal portion of the engine hood extends near a lower side portion of a front window panel, thereby covering the upper portion of the wiper unit.

However, in such a structure, since the rear distal portion of the engine hood becomes close to the upper end portion of a wiper pivot of the wiper unit, the rear distal portion of the engine hood is brought into contact with the wiper pivot when the force such a impact acts on the rear distal portion of the engine hood along the direction from the upper side to the lower side of the vehicle body at a time of a collision of the vehicle or the like, so that the engine hood tends to be prevented from deforming downward. That is, this restriction of the deformation corresponds to a restricting condition in the case of desiring to increase an absorption amount of a collision energy.

SUMMARY OF THE INVENTION

An object of the present invention is to provide a wiper device for a vehicle which be able to improve an absorption characteristic of a collision energy without substantially restricting a deformation of a rear distal portion of a engine hood to a lower side of a vehicle body by a wiper pivot when a load due to a collision or the like acts on the rear distal portion of the engine hood from an upper side of the vehicle body (corresponding to an outer side of the vehicle body) to a lower side of the vehicle body (corresponding to an inner side of the vehicle body).

Accordingly, the wiper device for a vehicle in accordance with the present invention is provided with a wiper motor, a wiper pivot connected to the wiper motor, and a load absorption portion for absorbing a load by moving the wiper pivot to an inner side of the vehicle body when a load having a value equal to or more than a predetermined value acts on the wiper pivot.

In this case, the wiper pivot can rotate around the pivot axis thereof by using a drive force from the wiper motor, and the wiper pivot extends so as to project toward an outer side of the vehicle body.

In accordance with the structure mentioned above, particularly speaking, when the load due to a collision or the like acts on the rear distal portion of the hood member typically corresponding to the engine hood from the outer side of the vehicle to the inner side thereof, and more particularly, from the upper side of the vehicle body to the lower side thereof, a deformation of the rear distal portion of the hood member toward the lower side of the vehicle body is substantially made free by use of the wiper pivot movable to the inner side of the vehicle body, thereby improving the absorption characteristic for the collision energy.

In this case, the wiper pivot is covered with the hood member in the outer side of the vehicle, particularly in the upper side thereof, and the load due to the collision or the like acts on the wiper pivot through the hood member.

Particularly speaking, in the wiper device for a vehicle in accordance with the present invention, the wiper pivot is provided on a wiper frame fixed to the vehicle body in each of a right side and a left side of the vehicle body, and a portion between the wiper frame corresponding to the wiper pivot disposed in the left side of the vehicle body and the wiper frame corresponding to the wiper pivot disposed in the right side of the vehicle body is preferably connected by a connection pipe.

Then, in the case mentioned above, the load absorption portion includes a wiper frame corresponding to the wiper pivot disposed in the left side of the vehicle body, a wiper frame corresponding to the wiper pivot disposed in the right side of the vehicle body and the connection pipe, and is structured such as to deform a joining portion between the wiper frame corresponding to the wiper pivot on which the load due to a collision or the like having a value equal to or more than a predetermined value acts and the connection pipe so as to move the wiper pivot to the inner side of the vehicle body, particularly to the lower side thereof, thereby absorbing the load, when the load acts on the wiper pivot.

In accordance with the structure mentioned above, the wiper pivot can make a deformation of the rear distal portion of the engine hood toward the lower side free by entering downward to the lower side of the vehicle body together with the wiper frame and increases the collapsing deformation stroke of the rear distal portion of the engine hood, thereby improving the absorption characteristic for the collision energy.

Further, in the wiper device for a vehicle in accordance with the present invention, the structure can be made such that the wiper pivot is fixed to the vehicle body through a bracket, and the load absorption portion includes a bracket and deforms the bracket when a load having a value equal to or more than a predetermined value acts on the wiper pivot, so as to move the wiper pivot to the inner side of the vehicle body, particularly to the lower side thereof, thereby absorbing the load.

In accordance with the structure mentioned above, when the load having a value equal to or more than the predetermined value acts on the wiper pivot in a direction of the pivot axis, the bracket fastening and fixing the distal portion of the wiper frame is collapsed, for example, from an easily bending portion, so that the wiper pivot enters downward to the lower side together with the wiper frame so as to make a deformation of the rear distal portion of the engine hood to the lower side free, thereby increasing the collapsing deformation stroke of the rear distal portion of the engine hood. Further, since an absorption of the collision energy can be performed by the collapsing deformation of the bracket, the absorption characteristic of the collision energy can be improved.

Further, in the wiper device for a vehicle in accordance with the present invention, the structure can be made such that the wiper pivot is fixed to the vehicle body through the bracket and a washer provided in the bracket, and the load absorption portion includes the washer and deforms the washer when a load having a value equal to or more than a predetermined value acts on the wiper pivot, so as to move the wiper pivot to the inner side of the vehicle body, particularly to the lower side thereof, thereby absorbing the load.

In accordance with the structure mentioned above, when the load having a value equal to or more than the predetermined value acts on the wiper pivot in a direction of the pivot axis, the washer interposed in the fastening portion between the distal portion of the wiper frame and the bracket is deformed in a collapsing manner, for example, from an easily bending portion of the washer, so that the wiper pivot enters downward to the lower side together with the wiper frame so as to make a deformation of the rear distal portion of the engine hood to the lower side free, thereby increasing the collapsing deformation stroke of the rear distal portion of the engine hood. Further, since an absorption of the collision energy can be performed by the collapsing deformation of the washer, the absorption characteristic of the collision energy can be improved.

Still further, in the wiper device for a vehicle in accordance with the present invention, the wiper pivot is mounted to a pivot holder fixed to the vehicle body, and the load absorption portion is preferably structured such as to relatively move the wiper pivot and the pivot holder when a load having a value equal to or more than a predetermined value acts on the wiper pivot, so as to move the wiper pivot to the inner side of the vehicle body, particularly to the lower side thereof, thereby absorbing the load.

Also in accordance with the structure mentioned above, the wiper pivot moves in the direction of the pivot axis to be released from the pivot holder, and enters downward to the inner side of the vehicle body, particularly to the lower side so as to make a deformation of the rear distal portion of the engine hood to the lower side free, thereby increasing the collapsing deformation stroke of the rear distal portion of the engine hood and further increasing the absorption characteristic of the collision energy.

More particularly speaking, the wiper pivot can be structured such as to include a first pivot mounted to the pivot holder and a second pivot detachably connected the first pivot, and the structure can be made such that when the load having a value equal to or more than a predetermined value acts on the wiper pivot, the second pivot is released from the first pivot while being slid along the first pivot, thereby absorbing the load.

Further, in the case of employing the structure mentioned above, more particularly, it is preferable that the load absorption portion is structured such as to include a combination between a projection of the first pivot and a concave portion of the second pivot with which it engages, a combination between a tooth portion of the first pivot and a tooth portion of the second pivot with which it engages, or a combination between a tapered internal surface of the first pivot in which a portion close to the inner side of the vehicle body, i.e., the lower side thereof has a large diameter and a tapered external surface of the second pivot corresponding to the internal surface and connected with it in a press fitting. manner.

Also in these structures, a sufficient collapsing deformation stroke can be secured while absorbing the collision energy by sliding the first pivot and the second pivot or canceling the engagement between the first pivot and the second pivot and the press fitting connection therebetween.

Further, as a structure in which the wiper pivot and the pivot holder can be relatively moved without separating the wiper pivot into the first pivot and the second pivot so as to form the load absorption portion, there are exemplified a structure in which the pivot holder and the groove portion of the wiper pivot are engaged with each other by a bracket piece, a combination between a spring piece provided in the pivot holder and exerting an urging force toward the wiper pivot and a taper portion of the wiper pivot engaging with the spring piece of the pivot holder, a structure in which the pivot holder and the groove portion of the wiper pivot are engaged with each other by an engaging piece having an easily breaking portion, or a structure in which the pivot holder and the groove portion of the wiper pivot are engaged with each other by using a first engaging piece and a second engaging piece.

Also in accordance with these structures, a sufficient collapsing stroke can be secured while absorbing the collision energy by slidably moving the wiper pivot from the pivot holder or canceling an engagement of the bracket piece or the like.

In the same manner, as a structure in which the wiper pivot and the pivot holder can be relatively moved without separating the wiper pivot into the first pivot and the second pivot so as to form the load absorption portion, there are exemplified a structure in which an engaging piece disposed between the pivot holder and the wiper pivot and a flange portion of the pivot holder are engaged with each other, a structure in which an engaging piece disposed between the pivot holder and the wiper pivot and a bush portion of the pivot holder are engaged with each other, or a structure in which a projection of the wiper pivot and a groove portion of the pivot holder are engaged with each other.

Further, in the wiper device for a vehicle in accordance with the present invention, the structure can be made such that the wiper pivot is mounted to the pivot holder fixed to the vehicle body, and the load absorption portion relatively moves the pivot holder and the vehicle body when a load having a value equal to or more than a predetermined value acts on the wiper pivot, so as to move the wiper pivot to the inner side of the vehicle body, particularly to the lower side thereof, thereby absorbing the load.

Also in accordance with the structure mentioned above, the wiper pivot can move in the direction of the pivot axis so as to be released from the vehicle body, and enters downward to the inner side of the vehicle body, particularly to the lower side thereof, so as to make a deformation of the rear end of the engine hood to the lower side free, thereby increasing the collapsing deformation stroke of the rear distal portion of the engine hood and improving the absorption characteristic for the collision energy.

More particularly speaking, in a structure in which the pivot holder is mounted to the vehicle body by a bolt and a nut, there are exemplified a structure of deforming a bolt mounting hole of the pivot holder, a structure of shearing a shear pin engaging the pivot holder with the bolt, or a structure in which a nut or a push nut is deformed or destroyed, so that a sufficient collapsing deformation stroke can be secured while absorbing the collision energy.

Further, in the structure in which the pivot holder is mounted to the vehicle body by a clip in place of the bolt and the nut, a sufficient collapsing deformation stroke can be secured while absorbing the collision energy in accordance that the clip is deformed or destroyed.

Still further, in the wiper device for a vehicle in accordance with the present invention, the wiper pivot is mounted to the pivot holder fixed to the vehicle body through a fixing portion using the bolt and the nut, and the load absorption portion includes a breaking portion provided in the pivot holder between the fixing portion and the wiper pivot and can be structured such as to break the pivot holder at the breaking portion when a load having a value equal to or more than a predetermined value acts on the wiper pivot, so as to move the wiper pivot to the inner side of the vehicle body, i.e., to the lower side thereof, thereby absorbing the load.

Also in accordance with the structure mentioned above, the wiper pivot can move in the direction of the pivot axis so as to be released from the vehicle body and enters downward to the inner side of the vehicle body, particularly to the lower side thereof, so as to make a deformation of the rear distal portion of the engine hood toward the lower side free, thereby increasing the collapsing deformation stroke of the rear distal portion of the engine hood and improving the absorption characteristic of the collision energy.

DETAILED DESCRIPTION OF THE PREFERRED EMBODIMENTS

Each of embodiments in accordance with the present invention will be described in detail with respect to the drawings.

At first, a first embodiment in accordance with the present invention will be described.

Figure 1:
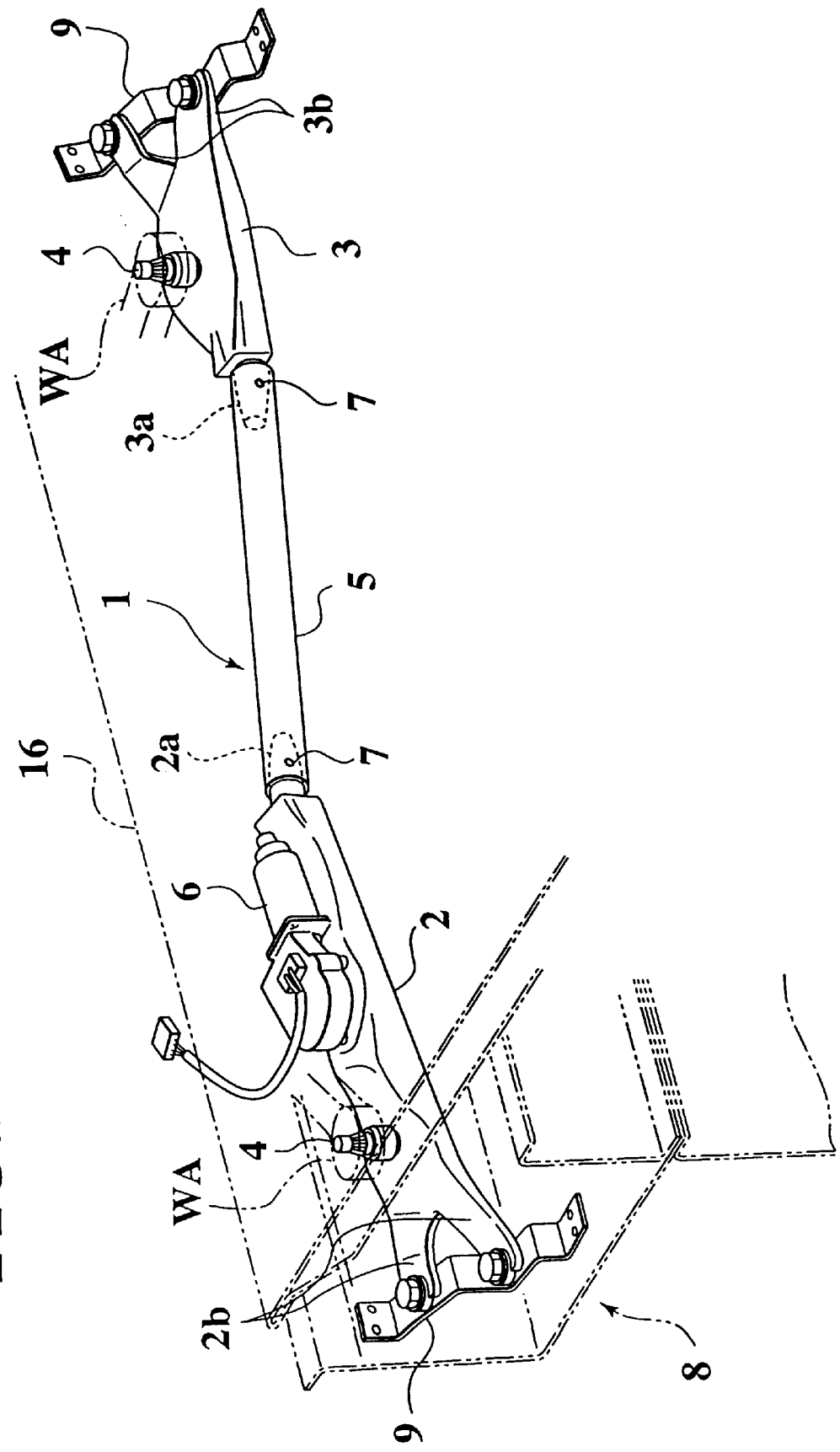
FIG. 1 is a perspective view which shows a wiper unit of a wiper device for a vehicle in accordance with a first embodiment of the present invention.
Figure 2:
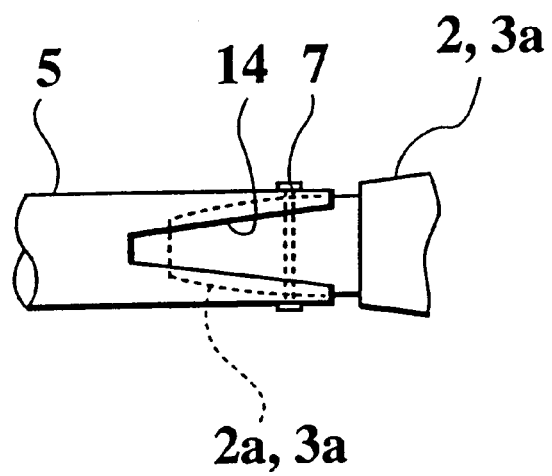
FIG. 2 is a bottom view which shows a connecting portion between a wiper frame and a connection pipe in accordance with the first embodiment of the present invention.
Figure 3:
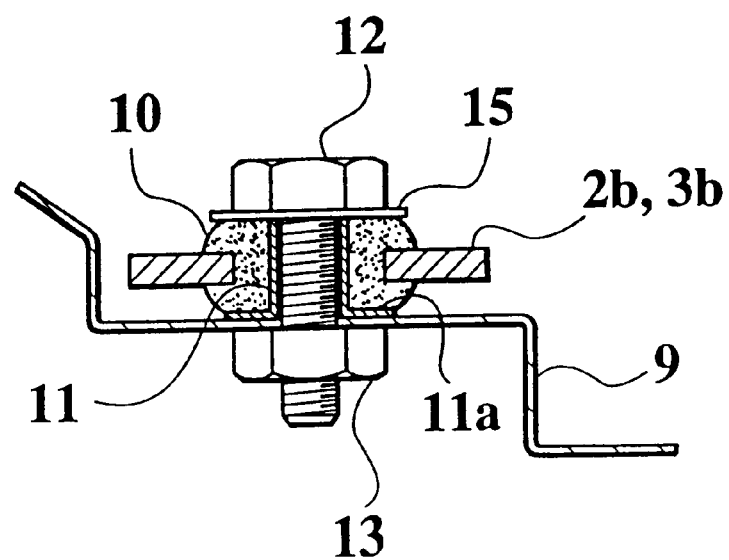
FIG. 3 is a cross sectional view which shows a joining portion between the wiper frame and a bracket in accordance with the first embodiment of the present invention.

In FIGS. 1 to 3, a wiper unit 1 of a frame type of a wiper device is provided with a wiper frame unit corresponding to a wiper device element structured by left and right wiper frames 2 and 3 respectively having wiper pivots 4 and 4 in a standing manner and a tubular connection pipe 5 connecting the wiper frames 2 and 3 to each other, and a wiper motor 6 corresponding to a wiper device element assembled in the wiper frame 2.

In this case, wiper arms NA and WA corresponding to wiper device elements are respectively mounted to the wiper pivots 4 and 4, and the other elements such as a wiper link with a pivot arm, a wiper blade and the like are omitted in illustration.

In this case, at ends of the wiper frames 2 and 3 which are opposed to each other, taper-shaped connecting projections 2a and 3a are respectively provided in a projecting manner, and the wiper frames 2 and 3 are connected to the connection pipe 5 by fitting the connection pipe 5 to the connecting projections 2a and 3a and arranging a rivet 7 in each connecting portion so as to penetrate its corresponding one of the projections 2a and 3a.

At the other ends of the wiper frames 2 and 3, bracket portions 2b and 3b branched into two portions are provided, and the wiper unit 1 is fastened and fixed onto brackets 9 welded and arranged between a bottom wall and a rear wall of a cowl box 8 through the bracket portions 2b and 3b.

More particularly speaking, a mount rubber 10 is attached to each of mounting holes in the bracket portions 2b and 3b, a collar 11 is fitted and inserted to a center portion of the mount rubber 10, a bolt 12 is inserted to the collar 11, and the bolt 12 is screwed and fastened to a weld nut 13 arranged on a back surface of the bracket 9.

Here, in this embodiment, the rivet 7 connecting and fixing each of the connecting projections 2a and 3a of the wiper frames 2 and 3 to the connection pipe 5 is arranged so as to penetrate its corresponding one of the projections 2a and 3a in a forward-and-backward direction (longitudinal direction) of the vehicle body crossing an pivot axis of the wiper pivot 4. The pivot axis exists typically and substantially along a upward-and-downward direction (vertical direction) of the vehicle body.

Also, a projection escaping cutout 14 allowing a distal end of each of the connecting projections 2a and 3a passing in a downward direction of the vehicle body is formed on a lower and end surface of the connection pipe 5 fitted to each of the connecting projections 2a and 3a.

The projection escaping cutout 14 is formed such as to have a suitable notch width smaller than a diameter of each of the connecting projections 2a and 3a, and is structured such that when a load having a value equal to or more than a predetermined value acts on each wiper pivot 4 along the pivot axis, that is, in a direction from an upper portion of the wiper pivot, the distal end of each of the connecting projections 2a and 3a passes under the projection escaping cutout 14 downward, so that each of the wiper frames 2 and 3 and the connection pipe 5 are allowed to be relatively rotated around each rivet 7 in a substantially L-shaped manner downward in a horizontal direction of the vehicle body, and an energy absorption can be performed by plastically deforming a side edge portion of the projection escaping cutout 14 by means of each of the connecting projections 2a and 3a at a time of passing downward.

In this case, the energy absorption amount due to the plastic deformation of the side edge portion in the projection escaping cutout 14 can be optionally adjusted by independently employing or suitably combining a mutual overlapping amount in a radial direction (corresponding to a vertical direction in FIG. 2) between each of the connecting projections 2a and 3a and the projection escaping cutouts 14, a length of each of the connecting projections 2a and 3a from the corresponding rivet 7 serving as a rotating center to the distal end thereof, a notch shape of each of the projection escaping cutouts 14 and the like.

More particularly speaking, in accordance with the embodiment, each of the projection escaping cutouts 14 is formed substantially in a V-shaped notch, and each of the connecting projections 2a and 3a is tapered such that its front end has a small diameter in its cross section along the radial direction.

In this case, in FIGS. 1 to 3, reference numeral 11a denotes a flange bent at a lower edge of the collar 11, reference numeral 15 denotes a washer disposed on the mount rubber 10 and reference numeral 16 denotes the engine hood.

In the structure mentioned above, when the wiper unit 1 is employed to a vehicle of a concealed wiper type, since the rear distal portion of the engine hood 16 extends near the lower portion of a front window panel (not shown), the upper portion of the wiper unit 1 is covered with the rear distal portion of the engine hood 16, so that an upper end portion of the wiper pivot 4 is disposed so as to be close to the lower surface of the rear distal portion of the engine hood 16.

In the arrangement mentioned above, when a collision load acts on the rear distal portion of the engine hood 16 from the above downward, that is, from the upper side to the lower side of the vehicle body at a time of a collision of the vehicle, at first, the rear distal portion of the engine hood 16 deforms downward and interferes with the upper end portion of the wiper pivot 4.

At this time, since the rivet 7 connecting and fixing each of the connecting projections 2a and 3a of the wiper frames 2 and 3 provided with the wiper pivots 4 and 4 in a standing manner to the distal portion of the connection pipe 5 is arranged so as to penetrate its corresponding one of the projections 2a and 3a in the forward-and-backward direction of the vehicle body crossing the pivot axis of the wiper pivot 4, and each of the projection escaping cutout 14 is formed on the lower surface of the distal portion of the connection pipe 5, so that each of the wiper frames 2 and 3 and the connection pipe 5 are relatively rotated around the rivet 7 in the substantially L-shaped manner downward in accordance that the collision load having a value equal to or more than a predetermined value acts on each of the wiper pivots 4 and 4 along the pivot axis thereof.

Then, the distal ends of the connecting projections 2a and 3a pass through the projection escaping cutouts 14, and the wiper pivots 4 and 4 enter downward together with the wiper frames 2 and 3, so as to make a deformation of the rear distal portion of the engine hood 16 to the lower side free, thereby increasing a collapsing deformation stroke of the rear distal portion of the engine hood 16.

Further, since each of the projection escaping cutouts 14 has a notch width smaller than the diameter of each of the connecting projections 2a and 3a, each distal end of the connecting projections 2a and 3a passes under the side edge portion of each projection escaping cutout 14 while the former is plastically deforming the latter, thereby absorbing the collision energy.

Accordingly, in accordance with this embodiment, as well as the collapsing deformation stroke of the rear distal portion of the engine hood 16 to the lower side is increased, an absorption characteristic of the collision energy can be improved.

Here, in accordance with this embodiment, since each of the connecting projections 2a and 3a of the wiper frames 2 and 3 is formed in the taper shape in which the front end has a small diameter, each of the distal ends of the connecting projections 2a and 3a easily and smoothly enters to the projection escaping cutouts 14, that is, a piloting characteristic of a passing-under operation of each of the connecting projections 2a and 3a is improved, so that the substantially L-shaped relative rotation between each of the wiper frames 2 and 3 and the connecting pipes 5 can be quickly and securely performed.

Next, a second embodiment in accordance with the present invention will be described below.

Figure 4:
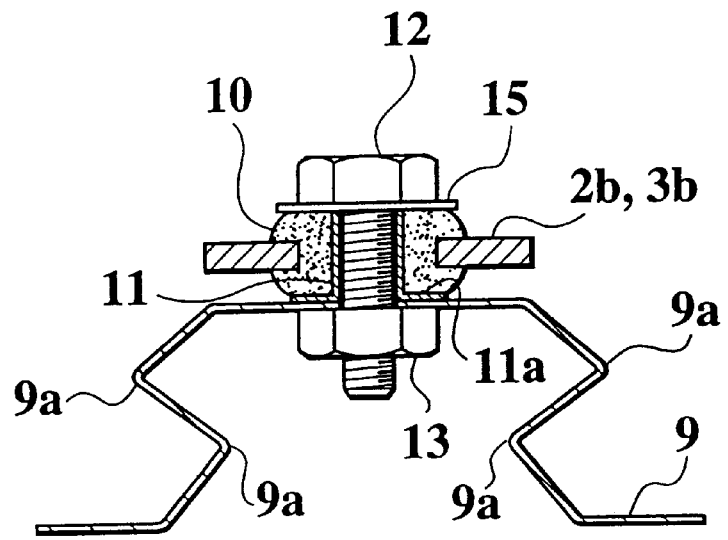
FIG. 4 is a cross sectional view which shows a joining portion between a wiper frame and a bracket in accordance with a second embodiment of the present invention.

As shown in FIG. 4, a structure of this embodiment is basically the same as that of the first embodiment, however, each of the connecting projections 2a and 3a of the wiper frames 2 and 3 each of which is provided with the wiper pivot 4 in a standing manner and the distal portion of connection pipe 5 is not connected by the rivet 7, but is simply connected and fixed by a welding, and further the projection escaping cutout 14 is not formed on the lower surface of each distal portion in the connection pipe 5.

Accordingly, in accordance with this embodiment, in place of the structures as seen in the first embodiment, easily bending portions 9a bent substantially in an L shape are formed in a portion to which each of bracket portions 2b and 3b of the wiper frames 2 and 3 is fastened and fixed by the bolt 12 and the weld nut 13 in the left and right brackets 9 welded and fixed to the cowl box 8, and this embodiment is different from the first embodiment in this arrangement view.

In this case, each of the bending portions 9a is structured so as to be easily buckled and deformed downward when the load having a value equal to or more than a predetermined value acts on the corresponding wiper pivot 4 along its pivot axis from the upper side.

Accordingly, in this embodiment, in the same manner as that of the first embodiment, the collision load acts on the rear distal portion of the engine hood 16 from the upper side at a time of a collision of the vehicle or the like, and the rear distal portion is deformed downward so as to interfere with the upper end of the wiper pivot 4, and when the collision load having a value equal to or more than a predetermined value acts on the wiper pivot 4 along the pivot axis, the bracket 9 fastening and fixing each distal portion of the wiper frames 2 and 3 is deformed in a collapsing manner (buckled) from each of the easily bending portions 9a.

Then, in accordance therewith, the wiper pivots 4 and 4 enter downward together with the wiper frames 2 and 3 so as to make the deformation of the rear distal portion of the engine hood 16 to the lower side free, thereby increasing the collapsing deformation stroke of the rear distal portion of the engine hood 16. Since the absorption of the collision energy can be simultaneously performed by the collapsing deformation of the bracket 9, the absorption characteristic of the collision energy can be further improved.

As mentioned above, in this embodiment, since it is structured such that each of the brackets 9 to which corresponding one of the bracket portions 2b and 3b of the wiper frames 2 and 3 is fastened and fixed is deformed in the collapsing manner from each of the easily bending portions 9a provided therein so that the wiper pivots 4 enters downward due to the collision load having a value equal to or more than a predetermined value, a structure in which the wiper pivots 4 and 4 enter downward can be made in simple.

Next, a third embodiment in accordance with the present invention will be described below.

Figure 5:
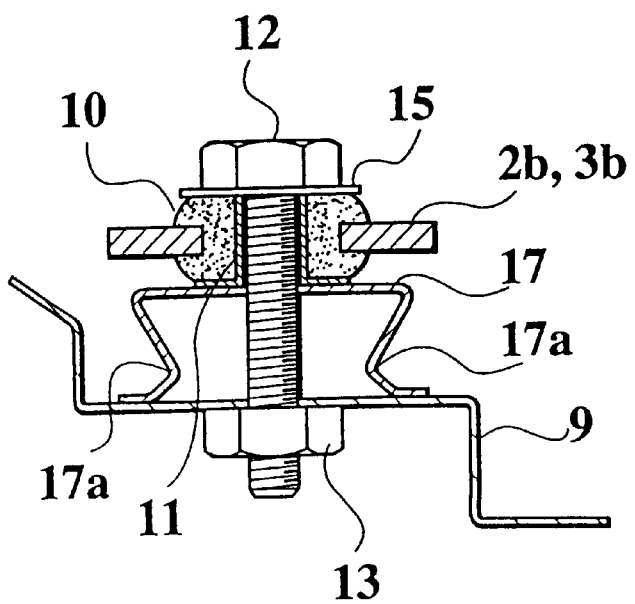
FIG. 5 is a cross sectional view which shows a joining portion between a wiper frame and a bracket in accordance with a third embodiment of the present invention.

As shown in FIG. 5, a basic structure of this embodiment is basically the same as that of the second embodiment, however, in place of the structure as seen in the second embodiment, in which the easily bending portions 9a bent in the substantially L shape are formed in the portion to which each of the bracket portions 2b and 3b of the wiper frames 2 and 3 is fastened and fixed by the bolt 12 and the weld nut 13, in each of the left and right brackets 9 welded and fixed to the cowl box 8, a substantially U-shaped washer 17 having side walls and a predetermined height is interposed between the other end of each of the wiper frames 2 and 3 each having the wiper pivot 4 in a standing manner and a fastening portion to the bracket 9 welded and fixed to the cowl box 8, particularly speaking, between the mount rubber 10 and the bracket 9. Then, this embodiment is different from the second embodiment in view of the above arrangement.

Then, substantially L-shaped easily bending portions 17a capable of being bent when the load having a value equal to or more than a predetermined value acts on the wiper pivot 4 from the upper side are formed on the side walls of the washer 17.

Accordingly, in accordance with the structure of this embodiment, when the collision load acts on the rear distal portion of the engine hood 16 from the upper side at a time of a collision of the vehicle and the rear distal portion deforms downward so as to interfere the upper end of the wiper pivot 4, whereby the collision load having a value equal to or more than a predetermined value acts on the wiper pivot 4 along its pivot axis, the washer 17 interposed between the mount rubber 10 in each of the bracket portions 2b and 3b of the wiper frames 2 and 3 and each of the brackets 9 at the cowl box 8 side is collapsed (buckled) from the easily bending portions 17a of the side walls thereof.

Then, each wiper pivot 4 enters downward together with each of the wiper frames 2 and 3 so as to make the deformation of the rear distal portion of the engine hood 16 to the lower side free, thereby increasing the collapsing deformation stroke of the rear distal portion of the engine hood 16. Simultaneously therewith the absorption of the collision energy can be performed by the collapsing deformation of the washer 17, so that the absorption characteristic of the collision energy can be improved.

As mentioned above, in this embodiment, since it is structured such that the washer 17 provided so as to correspond to each of the bracket portions 2b and 3b of the wiper frames 2 and 3 is deformed in a collapsing manner from each of the easily bending portions 17a on the side walls thereof so that each of the wiper pivot 4 enters downward due to the collision load having a value equal to or more than a predetermined value, a structure in which each wiper pivot 4 enters downward can be made in simple.

Next, a fourth embodiment in accordance with the present invention will be described below.

Figure 6:
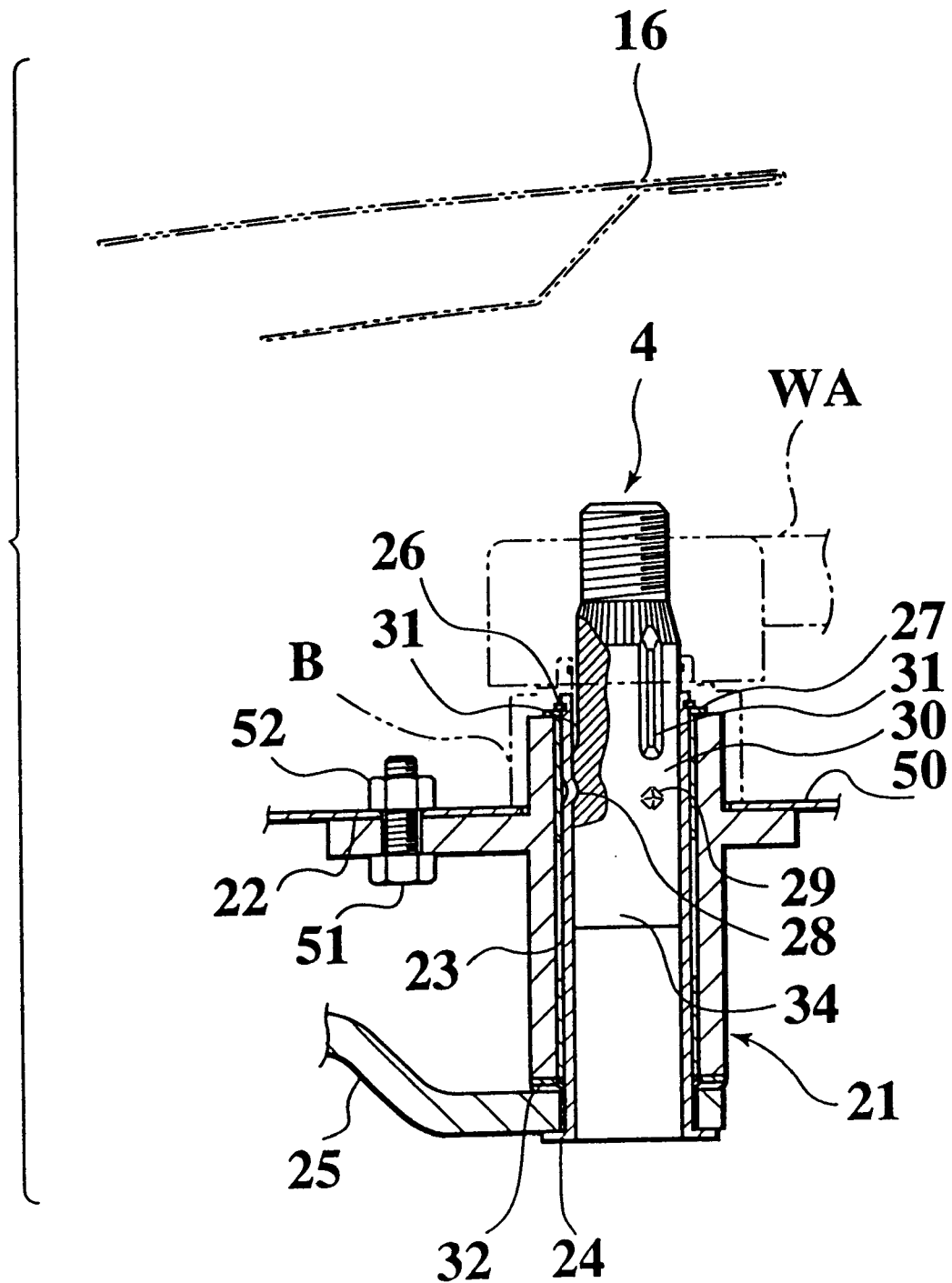
FIG. 6 is a cross sectional view which shows a state of mounting a pivot holder of a wiper unit to a vehicle body in accordance with a fourth embodiment of the present invention.
Figure 7:
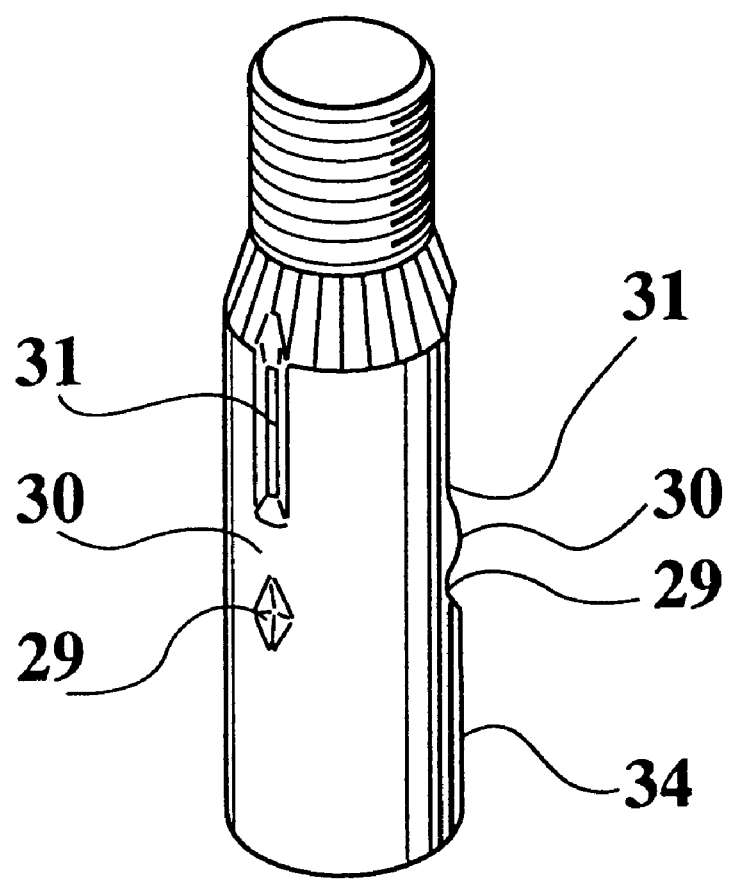
FIG. 7 is a perspective view of the wiper pivot in accordance with the fourth embodiment of the present invention.

As shown in FIGS. 6 and 7, a structure of this embodiment basically differs from that of the first embodiment, that is, the wiper frames 2 and 3, each having the wiper pivot 4 in a standing manner, and the connection pipe 5 connecting the wiper frames 2 and 3 through the connecting projections 2a and 3a by means of the rivets 7 are not provided.

Particularly, a pivot holder 21 for each wiper pivot 4 in the wiper unit is structured such that the base portion 22 thereof is overlapped on the vehicle body panel, for example, on a back surface of the cowl top panel 50, and then fastened and fixed to a cowl top panel 50 by a bolt 51 and a nut 52. In FIG. 6, only one pair of the bolt 51 and nut 52 is shown, however, the number thereof can be promptly set in accordance with design choice.

Then, the wiper pivot 4 is supported to a bearing hole 23 of the pivot holder 21 in a freely rotatable manner, and a pivot arm 25 connected to a drive transmitting link of a wiper motor (not shown) is fixed to the lower end thereof.

In this case, the wiper pivot 4 is constituted by a cylindrical first pivot 24 caulking and fixing the pivot arm 25 to the lower end thereof and a second pivot 34 inserted into the first pivot 24.

The first pivot 24 is inserted to the bearing hole 23 of the pivot holder 21 from the lower side thereof, and an upper distal portion thereof is prevented from coming out by means of a come-out prevention ring 26 and a plain washer 27.

A plurality of projections 28 are concentrically provided on an inner peripheral surface of the upper portion of the first pivot 24 in a projecting manner. An arrangement and a number of the projections 28 are described as an example, and for example, a zigzag arrangement, a staggered arrangement or the like can be employed, and further only one projection may be provided as occasion demands.

On the other hand, the second pivot 34 is structured so as to be fitted to an inner peripheral surface of a substantially upper half portion in the first pivot 24 in such a manner that the upper end of the second pivot 34 projects upwardly from the first pivot 24, thereby connecting the upwardly portion of the second pivot 34. A wiper arm WA is connected to the portion of the second pivot 34 projected from the first pivot 24.

Then, concave portions 29 are formed at portions corresponding to the projections 28 on the peripheral surface of the second pivot 34, so that the first pivot 24 and the second pivot 34 are engaged and connected in a non-rotating manner by engaging the projections 28 with the concave portions 29.

Further, vertical grooves 31 are formed above the concave portions 29 of the second pivot 34 at a boundary of projecting edge portions 30, and, when the load having a value equal to or more than a predetermined value acts on the second pivot 34 along a pivot axis from the upper side, the projections 28 override the projecting edge portions 30 and drop to the vertical grooves 31, thereby allowing the second pivot 34 to slide downward. Here, the pivot axis exists along a upward-and-downward (vertical) direction in FIG. 6.

In this case, in FIG. 6, reference numeral 32 denotes a washer and reference symbol B denotes a sealing boot mounted so as to cover the arranging area of the come-out preventing ring 26 and the like.

In accordance with this embodiment mentioned above, in the case of employing the wiper unit to the vehicle of the concealed wiper type, since the rear distal portion of the engine hood 16 extends near the lower side portion of the front window panel (not shown), the upper portion of the wiper unit is covered with the rear distal portion of the engine hood 16 and the upper end portion of the second pivot 34 in the wiper pivot 4 becomes close to the lower surface of the rear distal portion in the engine hood 16.

Accordingly, when the collision load acts on the rear distal portion of the engine hood 16 from the upper side at a time of a collision of the vehicle or the like, the rear distal portion of the engine hood 16 deforms downward and interfere with the upper end of the second pivot 34.

At this time, when the collision load having a value equal to or more than a predetermined value acts on the second pivot 34 from the upper side, the second pivot 34 slides in the downward direction in such a manner that the projecting edge portions 30 disposed at the upper side of the concave portions 29 in the second pivot 34 override the projection 28 of the first pivot 24 to the downward direction.

Then, the projections 28 of the first pivot 24 drop to the vertical grooves 31 disposed adjacent to the upper side of the concave portions 29, so that the second pivot 34 enters downward, thereby making a deformation of the rear distal portion of the engine hood 16 to the lower side free.

As a result, the collapsing stroke of the rear distal portion of the engine hood 16 to the lower portion can be increased, and the absorption characteristic of the collision energy can be improved.

As mentioned above, in this embodiment, since the wiper pivot 4 is constituted by the cylindrical first pivot 24 and the second pivot 34 which is connected to the first pivot in a non-rotating manner, and the pivot 34 slides to the lower side and enters downward due to the collision load having a value equal to or more than a predetermined value, the structure of the wiper pivot 4 for entering downward can be made in simple.

Next, a fifth embodiment in accordance with the present invention will be described below.

Figure 8:
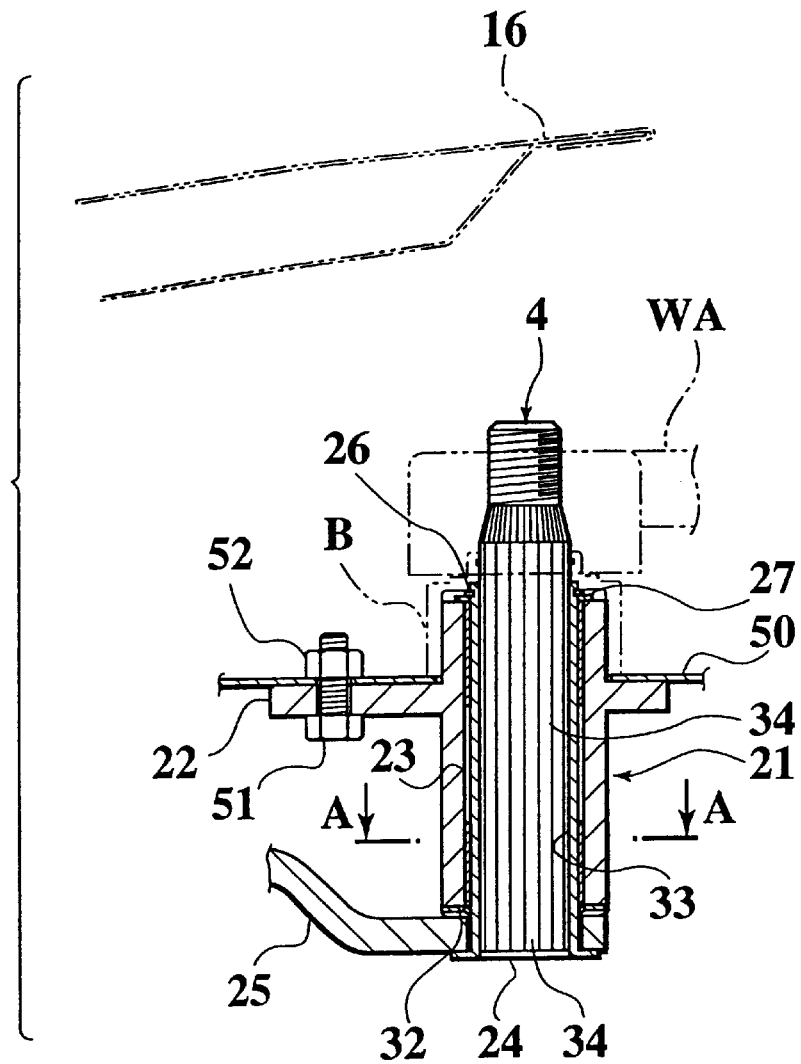
FIG. 8 is a cross sectional view which shows a state of mounting a pivot holder of a wiper unit to a vehicle body in accordance with a fifth embodiment of the present invention.
Figure 9:
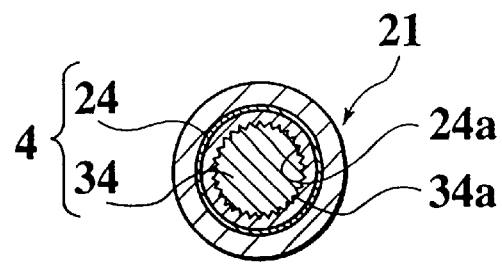
FIG. 9 is a cross sectional view along a line A—A in FIG. 8.

As shown in FIGS. 8 and 9, also in accordance with this embodiment, the wiper pivot 4 is constituted by the cylindrical first pivot 24 and the second pivot 34 inserted and arranged in the first pivot 24, so that the first pivot 24 is arranged in the bearing hole 23 of the pivot holder 21 in a freely rotatable manner and a come-out preventing manner and the upper end of the second pivot 34 is upwardly projected from the upper end of the first pivot 24 so as to connect the wiper arm WA in the same manner as that of the fourth embodiment.

However, in accordance with this embodiment, tooth portions 24a and 34a formed by a serration, a spline or the like are formed on an inner peripheral surface of the first pivot 24 and an outer peripheral surface of the second pivot 34, so that the first pivot 24 and the second pivot 34 are made non-rotatable by the tooth portions 24a and 34a, and the first pivot 24 and the second pivot 34 are mutually meshed with and connected to each other in such a manner that they are relatively slidable in the direction of the pivot axis with respect to the load having a value equal to or more than a predetermined value acting on the second pivot 34 along the pivot axis from the upper side. Accordingly, this embodiment is different from the fourth embodiment in view of the above point.

In accordance with the embodiment mentioned above, when the collision load acts on the rear distal portion of the engine hood 16 from the upper side at a time of a collision of the vehicle or the like, the rear distal portion deforms downward and interferes with the upper end of the second pivot 34, the collision load having a value equal to or more than a predetermined value acts on the second pivot 34, and the second pivot 34 slides to the lower side and enters downward with respect to the first pivot 24.

Accordingly, the collapsing stroke of the rear distal portion of the engine hood 16 to the lower side can be increased and the absorption characteristic of the collision energy can be improved.

As mentioned above, in accordance with this embodiment, since the wiper pivot 4 is constituted by the cylindrical first pivot 24 and the second pivot 34 and the both are meshed and connected by a serration fitting, a spline fitting or the like so as to be capable of relatively sliding in the direction of the pivot axis direction due to a predetermined load condition, a structure of the wiper pivot 4 for downward entering can be made in simple.

Next, a sixth embodiment in accordance with the present invention will be described below.

Figure 10:
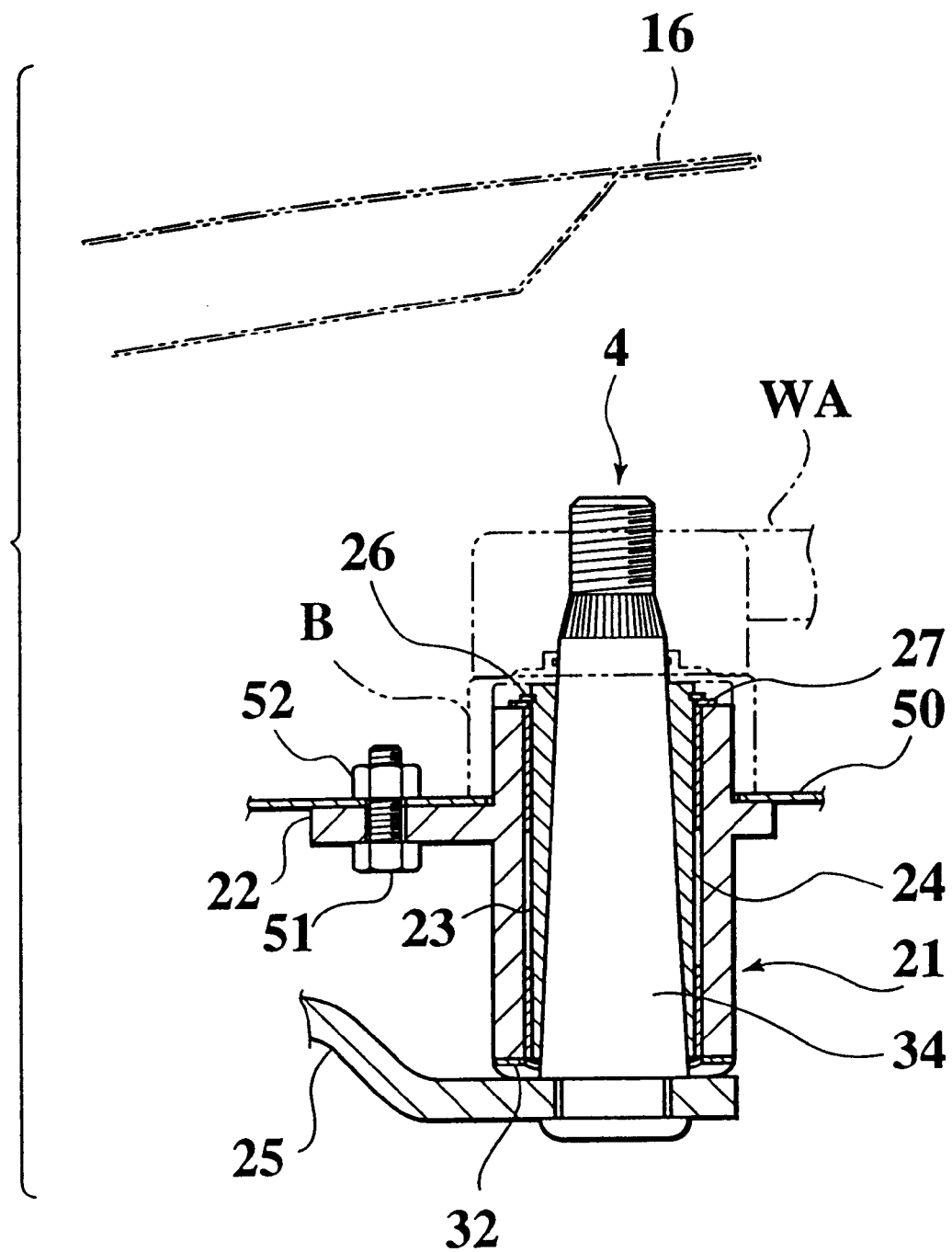
FIG. 10 is a cross sectional view which shows a state of mounting a pivot holder of a wiper unit to a vehicle body in accordance with a sixth embodiment of the present invention.

As shown in FIG. 10, also in accordance with this embodiment, the wiper pivot 4 is constituted by the cylindrical first pivot 24 and the second pivot 34 inserted and arranged in the first pivot 24, so that the first pivot 24 is arranged in the bearing hole 23 of the pivot holder 21 in a freely rotatable manner and a come-out preventing manner and the upper end of the second pivot 34 is upwardly projected from the upper end of the first pivot 24 so as to connect the wiper arm WA in the same manner as that of the fourth embodiment.

However, in accordance with this embodiment, in the first pivot 24, an inner periphery thereof is formed in a taper shape such that its lower end side has a large diameter, and the second pivot 34 is formed in a taper shape such that its upper end side has a small diameter in correspondence to the first pivot 24.

Then, the pivot arm 25 is fixedly provided in the lower end of the second pivot 34, the second pivot 34 is inserted from the lower side of the first pivot 24, and the first pivot 24 and the second pivot 34 are integrally pressed and connected by a thermal caulking, a close fit or the like such that the second pivot 34 can remove to the lower side from the first pivot 24 when the load having a value equal to or more than a predetermined value acts on the second pivot 34 in the direction of the pivot axis from the upper side.

In accordance with this embodiment mentioned above, the first pivot 24 and the second pivot 34 are connected in a non-rotating manner in a usual state, however, when the collision load acts on the rear distal portion of the engine hood 16 from the upper side at a time of a collision of the vehicle, the rear distal portion of the engine food 16 deforms downward and interferes with the upper end of the second pivot 34 and the collision load having a value equal to or more than a predetermined value acts on the second pivot 34, the second pivot 34 is released from the first pivot 24 to the lower side and enters downward.

Accordingly, the collapsing stroke of the rear distal portion of the engine hood 16 to the lower side can be increased and the absorption characteristic of the collision energy can be improved.

As mentioned above, in accordance with this embodiment, since the wiper pivot 4 is constituted by the cylindrical first pivot 24 and the second pivot 34 and the both are pressed and fitted by using the tapered surface, whereby the second pivot 34 can be apart from the first pivot 24 to the lower side due to a predetermined load condition, a structure of the wiper pivot 4 for downward entering can be made in simple.

Next, a seventh embodiment in accordance with the present invention will be described below.

Figure 11:
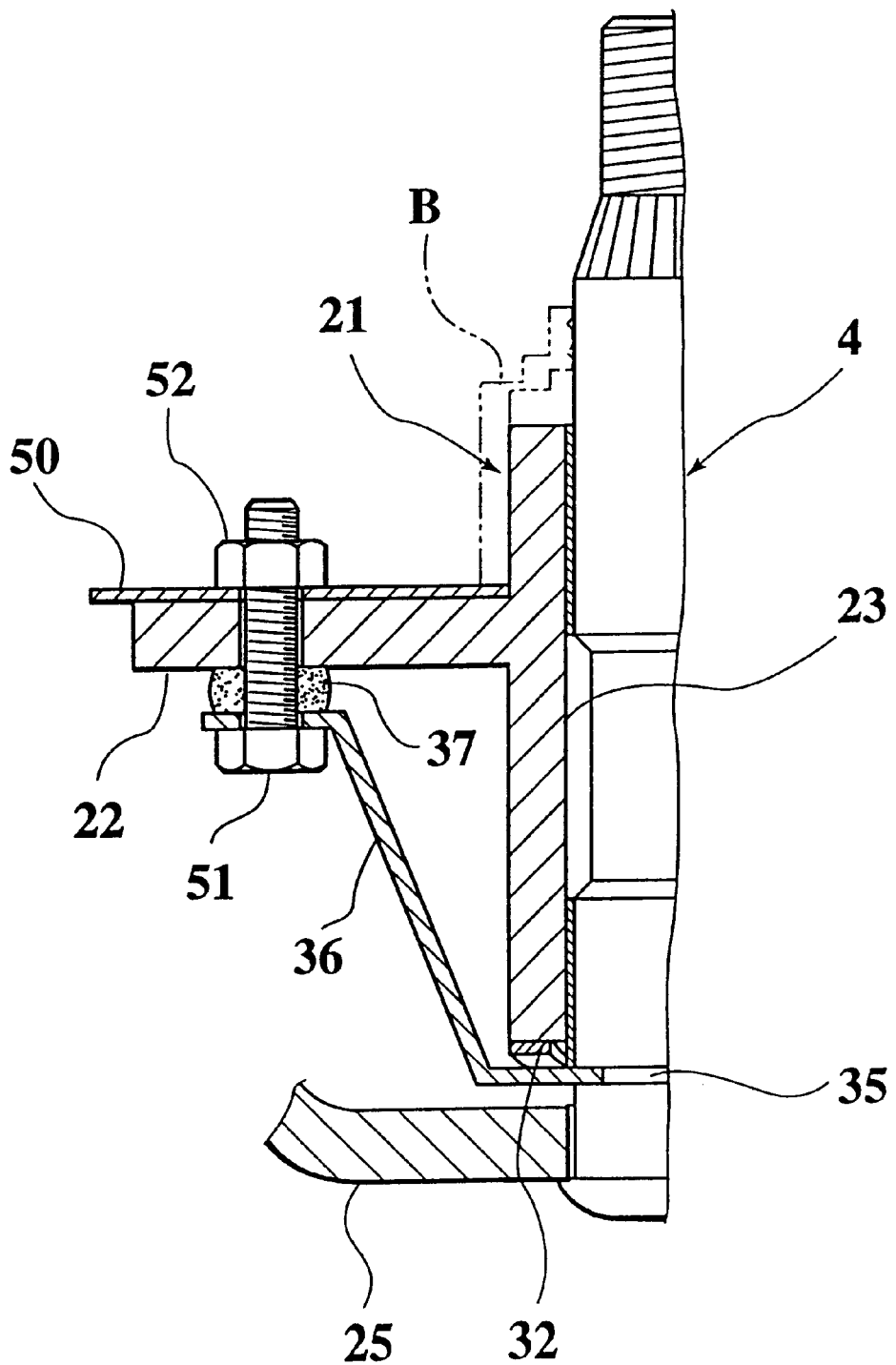
FIG. 11 is a cross sectional view which shows a state of mounting a pivot holder of a wiper unit to a vehicle body in accordance with a seventh embodiment of the present invention.

As shown in FIG. 11, in accordance with this embodiment, in place of constituting the wiper pivot 4 by the cylindrical first pivot 24 and the second pivot 34 inserted and arranged in the first pivot 24 as in the fourth embodiment, the wiper pivot 4 is constituted by a single member. That is, this embodiment is basically different from the fourth embodiment in view of the point mentioned above.

More particularly speaking, the wiper pivot 4 constituted by a single member is inserted to the bearing hole 23 of the pivot holder 21 from the lower side thereof, and supported to the bearing hole 23 in a freely rotatable manner.

Then, in the lower distal portion of the wiper pivot 4, an annular groove 35 is formed at a portion projecting to the lower portion from the bearing hole 23.

On the contrary, each of bracket pieces 36 is fastened and fixed to the back surface of the base portion 22 in the pivot holder 21 through a vibration isolating bush 16 by means of a bolt 51 and a nut 52. The end of each of the bracket pieces 36 engages with the annular groove 35 and wiper pivot 4 is prevented from coming out in such a manner that the wiper pivot 4 can be released from the bearing hole 23 of the pivot holder 21 with respect to the load having a value equal to or more than a predetermined value acting on the wiper pivot 4 along the pivot axis from the upper side by engaging each of the bracket pieces 36 with the annular groove 35. The number of the bracket pieces 36 correspond to that of the portions to be fastened and fixed by the bolt 51 and nut 52.

In this case, the spring washer 32 is interposed between the lower hole edge of the bearing hole 23 and the distal portion of the bracket piece 36, and serves to avoid a play between the wiper pivot 4 and the pivot holder 21.

In accordance with this embodiment mentioned above, when the collision load acts on the rear distal portion of the engine hood 16 from the upper side at a time of a collision of the vehicle, the rear distal portion thereof deforms downward and interferes with the upper end of the wiper pivot 4 and the collision load having a value equal to or more than a predetermined value acts on the wiper pivot 4, the upper edge of the annular groove 35 downward presses the end of each of the bracket pieces 36 so as to deform it, an engagement between the annular groove 35 and each of the bracket pieces 36 is released, and the wiper pivot 4 slides in a downward direction removing from the bearing hole 23 and enters downward.

Accordingly, the collapsing stroke of the rear distal portion of the engine hood 16 to the lower side can be increased and the absorption characteristic of the collision energy can be improved.

As mentioned above, in accordance with this embodiment, since each of the bracket pieces 36 deforming under a predetermined load condition is additionally provided, a structure of the wiper pivot 4 for downward entering can be made in simple.

An eighth embodiment in accordance with the present invention will be described below.

Figure 12:
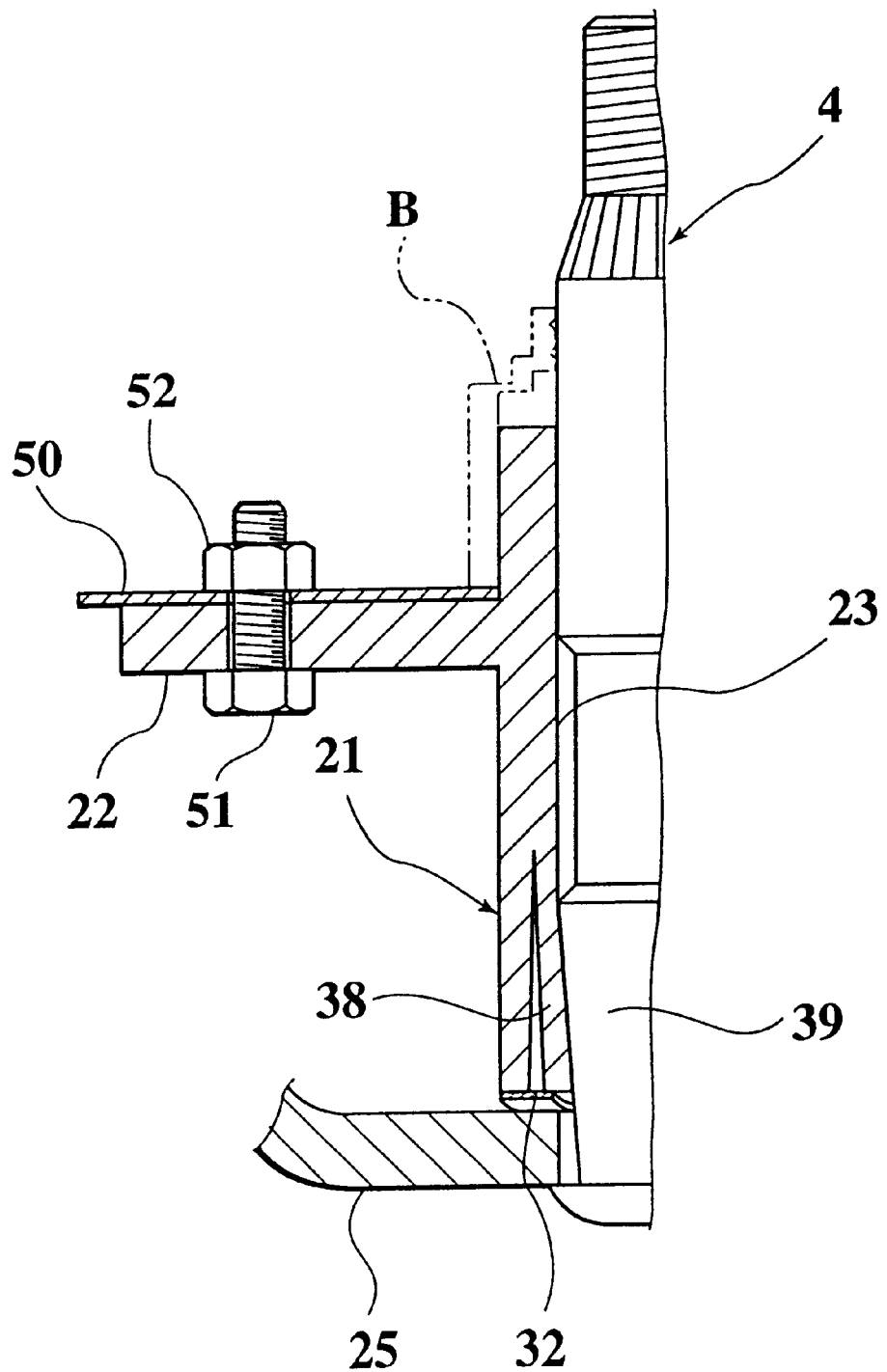
FIG. 12 is a cross sectional view which shows a state of mounting a pivot holder of a wiper unit to a vehicle body in accordance with an eighth embodiment of the present invention.

As shown in FIG. 12, also in accordance with this embodiment, in place of constituting the wiper pivot 4 by the cylindrical first pivot 24 and the second pivot 34 inserted and arranged in the first pivot 24 as in the fourth embodiment, the wiper pivot 4 is constituted by a single member. Accordingly, this embodiment is basically different from the fourth embodiment in view of the point mentioned above.

More particularly speaking, a plurality of spring pieces 38 structured such as to float up along a radial direction of the bearing hole 23 in the lower end portion thereof are formed in the lower side portion of the bearing hole 23 in the pivot holder 21 by cutting up, and the taper portion 39 in which the lower end side has a small diameter is formed in the lower side portion of the wiper pivot 4 brought into slidable contact with the spring pieces 38, thereby engaging the taper portion 39 with the spring pieces 38.

Then, by the engagement of the taper portion 39 with the spring pieces 38, the wiper pivot 4 is prevented from coming out in such a manner that the wiper pivot 4 can be released from the pivot holder 21 with respect to the load having a value equal to or more than a predetermined value acting on the wiper pivot 4 in the direction of the pivot axis from the upper side.

In accordance with this embodiment mentioned above, when the collision load acts on the rear distal portion of the engine hood 16 from the upper side at a time of a collision of the vehicle, the rear distal portion deforms downward and interferes with the upper end of the wiper pivot 4 and the collision load having a value equal to or more than a predetermined value acts on the wiper pivot 4, the taper portion 39 of the wiper pivot 4 expands the spring pieces 38 of the bearing hole 23, and the wiper pivot 4 slides in a downward direction removing from the bearing hole 23 and enters downward.

Accordingly, the collapsing stroke of the rear distal portion of the engine hood 16 to the lower portion can be increased and the absorption characteristic of the collision energy can be improved.

Further, since the collision energy can be absorbed by an expanding motion of the spring pieces 38 due to the taper portion 39, the absorption characteristic of the collision energy can be further improved.

Still further, since an exclusive come-out prevention part for preventing the wiper pivot 4 from coming out is not required, it is costly advantageous.

As mentioned above, in accordance with this embodiment, since the taper portion 39 of the wiper pivot 4 and the spring pieces 38 of the bearing hole 23 are combined and it is set that the taper portion 39 of the wiper pivot 4 expands the spring piece 38 of the bearing hole 23 under a predetermined load condition, a structure of the wiper pivot 4 for downward entering can be made in simple.

An ninth embodiment in accordance with the present invention will be described below.

Figure 13:
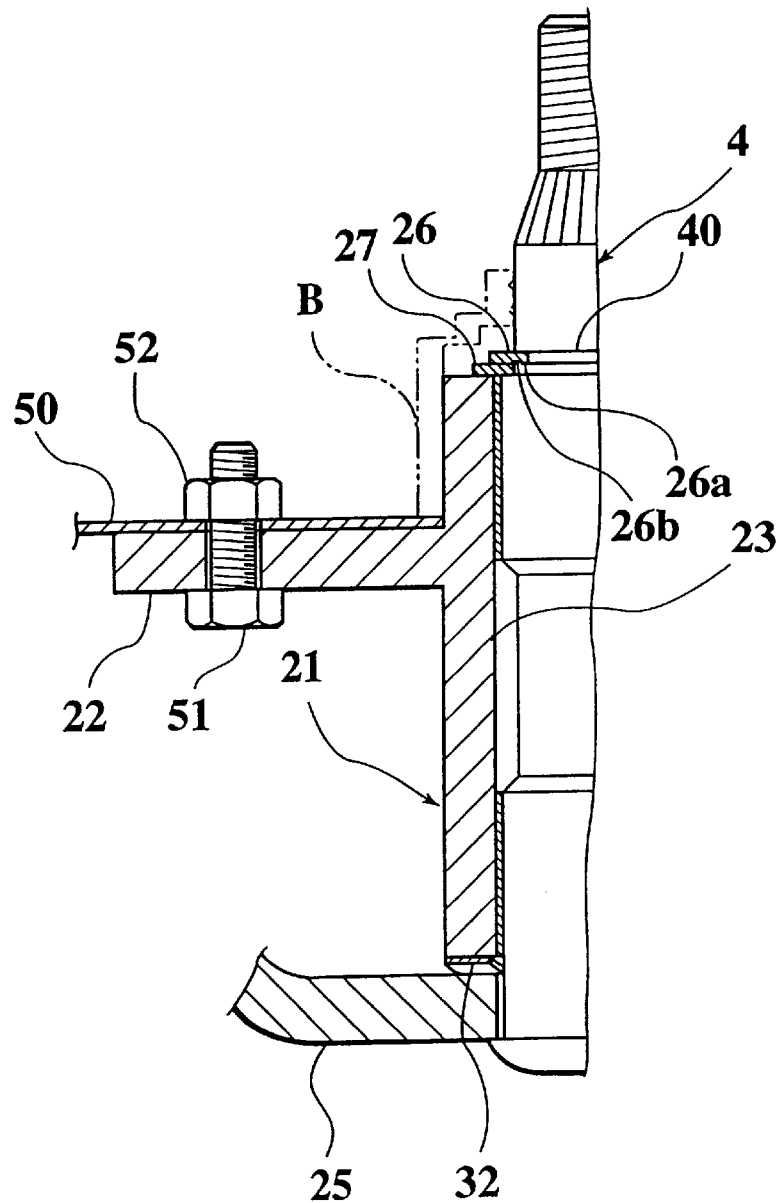
FIG. 13 is a cross sectional view which shows a state of mounting a pivot holder of a wiper unit to a vehicle body in accordance with a ninth embodiment of the present invention.
Figure 14:
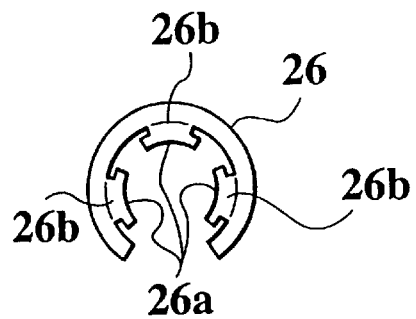
FIG. 14 is a plan view of a come-out prevention ring in accordance with the ninth embodiment of the present invention.

As shown in FIGS. 13 and 14, also in accordance with this embodiment, in place of constituting the wiper pivot 4 by the cylindrical first pivot 24 and the second pivot 34 inserted and arranged in the first pivot 24 as in the fourth embodiment, the wiper pivot 4 is constituted by a single member. Accordingly, this embodiment is basically different from the fourth embodiment in view of the point mentioned above.

More particularly speaking, in the upper distal portion of the wiper pivot 4, an annular groove 40 is provided at a portion projecting upwardly from the bearing hole 23 of the pivot holder 21.

Then, the wiper pivot 4 is prevented from coming out by means of a come-out prevention ring 26 and a plain washer 27 by interposing the plain washer 27 between the come-out prevention ring 26 and the upper hole edge of the bearing hole 23, as well as locking the come-out prevention ring 26, which is a kind of so-called C ring having a plurality of engaging pieces 26a on an inner periphery thereof, with the annular groove 40 so as to fit the engaging piece 26a to the annular groove 40.

And, further, an easily breaking portion 26b which can break when the load having a value equal to or more than a predetermined value acts on the wiper pivot 4 in an axial direction from the upper side is provided in a projecting base portion of each of the engaging pieces 26a of the come-out prevention ring 26. Each of the easily breaking portions 26b is constituted by forming a notch portion and making the projecting base portion of each of the engaging pieces 26a thin.

In accordance with this embodiment mentioned above, when the collision load acts on the rear distal portion of the engine hood 16 from the upper side at a time of a collision of the vehicle, the rear distal portion deforms downward and interferes with the upper end of the wiper pivot 4 and the collision load having a value equal to or more than a predetermined value acts on the wiper pivot 4, a shearing load acts on each of the easily breaking portions 26b of the engaging pieces 26a in the come-out prevention ring 26 held between the upper end of the annular groove 40 and the inner peripheral edge of the plain washer 27, so that the engaging pieces 26a are broken and separated from the easily breaking portions 26b.

Accordingly, the wiper pivot 4 slides in a downward direction removing from the bearing hole 23 and enters downward, so that the collapsing stroke of the rear distal portion of the engine hood 16 to the lower side can be increased and the absorption characteristic of the collision energy can be improved.

As mentioned above, in accordance with this embodiment, since the easily breaking portions 26b are provided in the engaging pieces 26a of the come-out prevention ring 26, an structure of the wiper pivot 4 for downward entering can be made in simple.

Further, since the come-out prevention ring 26 itself can realize the structure of the wiper pivot 4 for downward entering as mentioned above without substantially increasing a number of the parts, it becomes costly advantageous.

Next, a tenth embodiment in accordance with the present invention will be described below.

Figure 15:
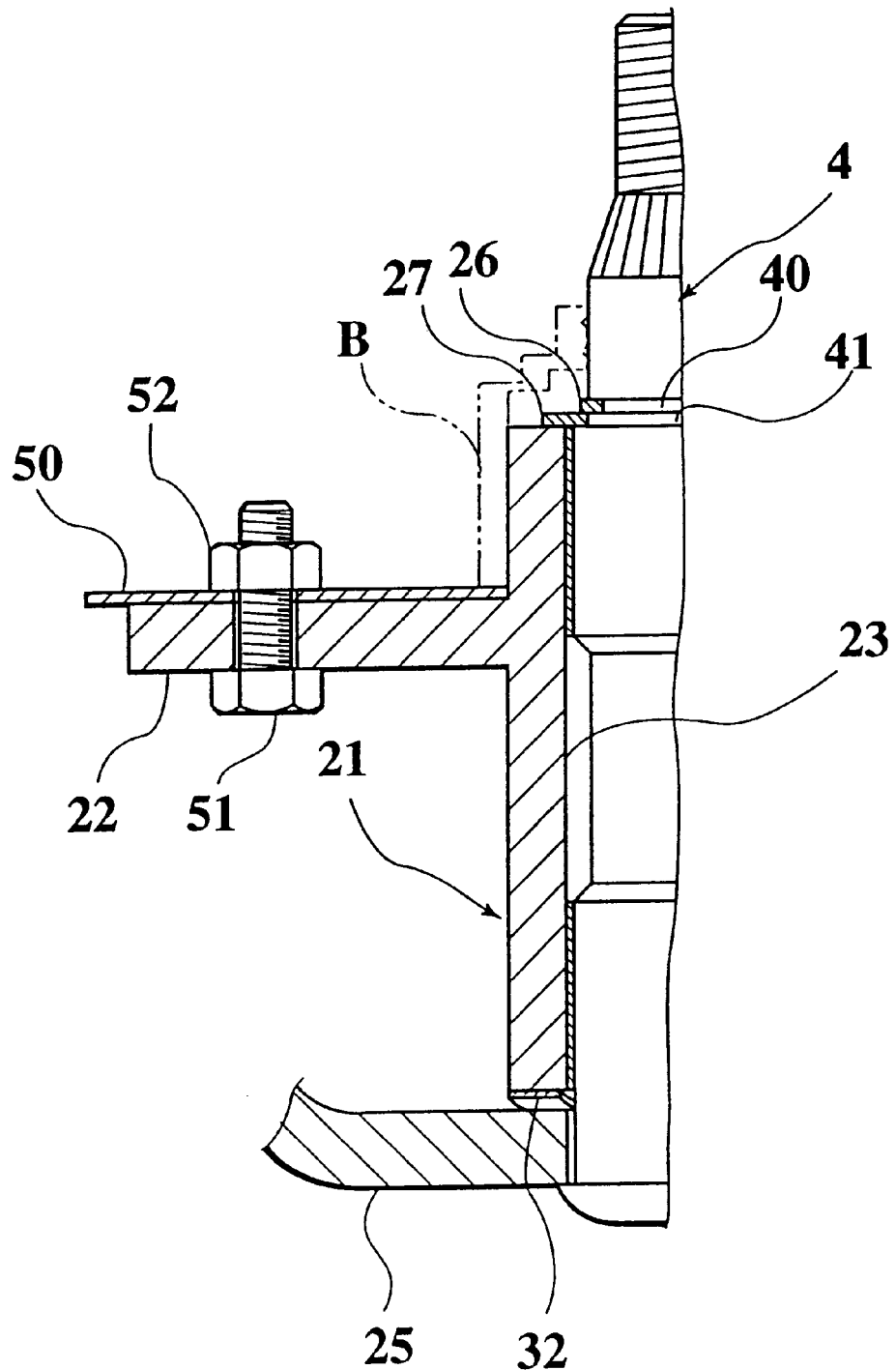
FIG. 15 is a cross sectional view which shows a state of mounting a pivot holder of a wiper unit to a vehicle body in accordance with a tenth embodiment of the present invention.

As shown in FIG. 15, also in accordance with this embodiment, in place of constituting the wiper pivot 4 by the cylindrical first pivot 24 and the second pivot 34 inserted and arranged in the first pivot 24 as in the fourth embodiment, the wiper pivot 4 is constituted by a single member. Accordingly, this embodiment is basically different, from the fourth embodiment in view of the point mentioned above.

More particularly speaking, the structure of preventing the wiper pivot 4 from coming out by the come-out prevention ring 26 engaged with the annular groove 40 in the upper distal portion of the wiper pivot 4 and the plain washer 27 is provided in the same manner as that of the ninth embodiment.

And, as well as a small diameter portion is formed in the upward projecting portion of the wiper pivot 4 and the annular groove 40 is formed on the small diameter portion, an annular step portion 41 corresponding to a surface aligned on the portion of the upper hole edge of the bearing hole 23 is formed in the lower edge of the annular groove 40, and the outer peripheral edge portion of the come-out prevention ring 26 is projected above the step portion 41 in a flange manner.

And, further, the plain washer 27 has a size capable of being arranged on both the upper hole edge of the bearing hole 23 and the step portion 41, and the portion thereof over the step portion 41 locks the come-out prevention ring 26 on the inner peripheral edge portion of the plain washer 27, thereby preventing the wiper pivot from coming out.

In this case, the plain washer 27 is made of a material such as a fiber reinforcing resin, a light metal die cast material or the like having a relatively high rigidity but having a brittleness, and it is structured such as to be capable of breaking the plain washer 27 between the lower side outer peripheral edge of the come-out prevention ring 26 and the upper hole edge of the bearing hole 23 with respect to the load acting on the wiper pivot 4 in the direction of the pivot axis from the upper side.

In accordance with this embodiment mentioned above, when the collision load acts on the rear distal portion of the engine hood 16 from the upper side at a time of a collision of the vehicle, the rear distal portion deforms downward and interferes with the upper end of the wiper pivot 4 and the collision load having a value equal to or more than a predetermined value acts on the wiper pivot 4, a shearing load acts on the plain washer 27 between the lower side outer peripheral edge of the come-out prevention ring 26 and the upper hole edge of the bearing hole 23, so that the plain washer 27 is broken.

Accordingly, the wiper pivot 4 slides in a downward direction removing from the bearing hole 23 and enters downward, so that the collapsing stroke of the rear distal portion of the engine hood 16 to the lower side can be increased and the absorption characteristic of the collision energy can be improved.

As mentioned above, in accordance with this embodiment, a structure of the wiper pivot 4 for downward entering can be made in simple by acting the shearing force on the plain washer 27 juxtaposed to the come-out prevention ring 26.

Further, since the structure mentioned above can be mainly realized by an arrangement of the plain washer 27 and a selection of the material thereof, it becomes costly advantageous without increasing a number of the parts.

In this case, in a structure of breaking and deforming not the plain washer 27 but the come-out prevention ring 26 itself, when the material having a high rigidity and having a brittleness is used, there is a case that the come-out prevention ring 26 is broken at a time of fitting the come-out prevention ring 26 to the annular groove 40, so there is a restriction that a relatively resilient material must be used. Therefore, in such a case, the rigidity of the wiper pivot 4 against an axial load received by the wiper pivot 4 at a time of operating the wiper unit is possibly lowered.

However, as in this embodiment, by making the plain washer 27 as a member to be broken, even in the case of using a material having a high rigidity and having a brittleness, the plain washer 27 is not broken at a time of mounting the wiper pivot 4, and the axial rigidity of the wiper pivot 4 at a time when the wiper unit is operated can be sufficiently secured.

Next, an eleventh embodiment in accordance with the present invention will be describe below.

Figure 16:
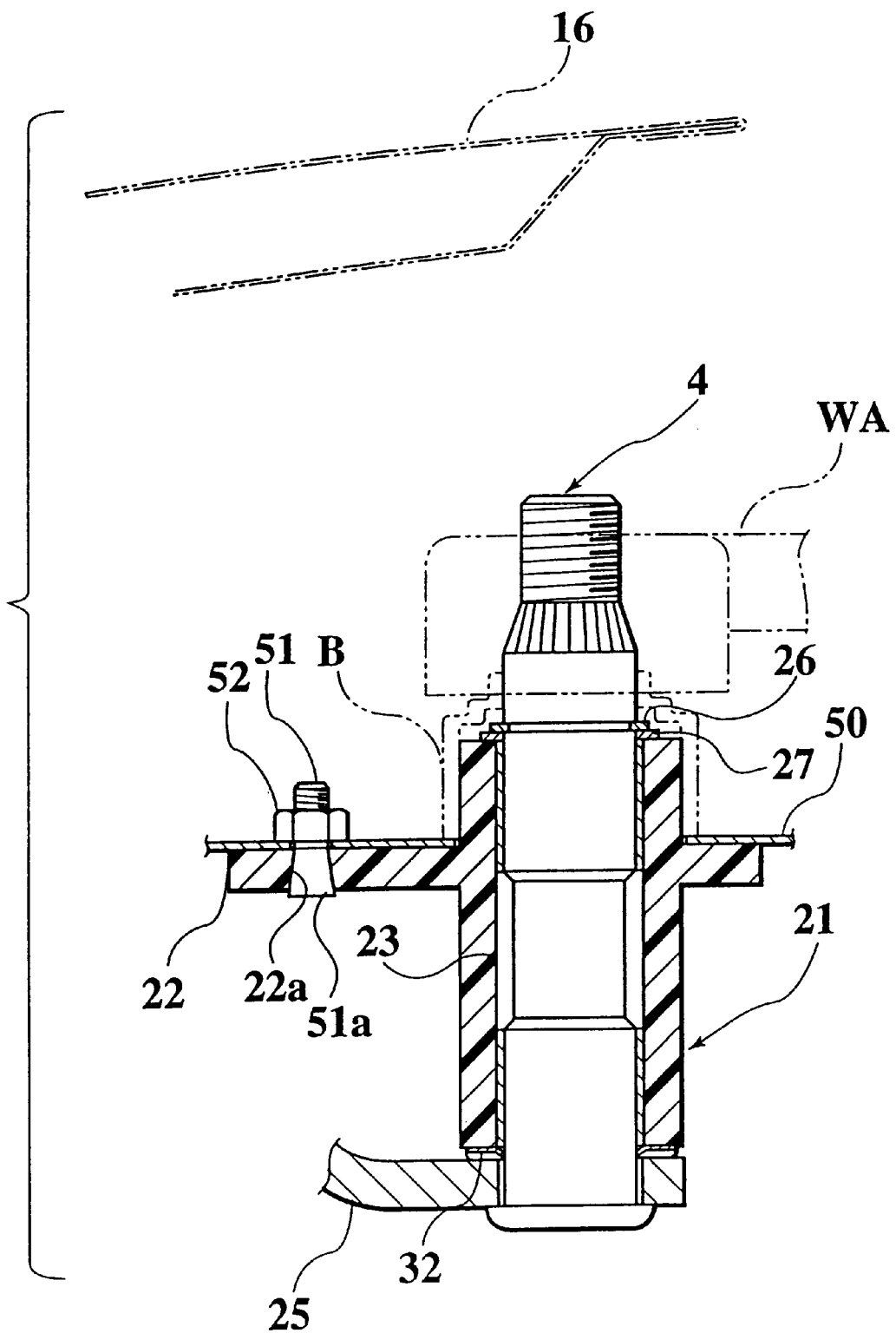
FIG. 16 is a cross sectional view which shows a state of mounting a pivot holder of a wiper unit to a vehicle body in accordance with an eleventh embodiment of the present invention.

As shown in FIG. 16, a structure of this embodiment basically differs from that of the first embodiment, that is, the wiper frames 2 and 3, each having the wiper pivot 4 in a standing manner, and the connection pipe 5 connecting the wiper frames 2 and 3 through the connecting projections 2a and 3a by means of the rivets 7 are not provided.

Particularly speaking, the pivot holder 21 in the wiper unit is fastened and fixed to the cowl top panel 50 by means of the bolt 51 and the nut 52 by overlapping the base portion 22 on the vehicle body panel, for example, the back surface of the cowl top panel 50. In fig.16, only a pair of the bolt 51 and nut 52 is shown, however, the number thereof can be promptly set in accordance with design choice.

Then, the wiper pivot 4 is supported to the bearing hole 23 of the bearing hole 23 of the pivot holder 21 in a freely rotatably manner, and the pivot arm 25 connected to a drive transmission link of the wiper motor (not shown) is fixed and provided at the lower end thereof.

Further, the wiper pivot 4 is inserted to the bearing hole 23 of the pivot holder 21 from the lower side and interposes the plain washer 27 between the come-out prevention ring 26 and the upper end of the bearing hole 23 as well as engaging the come-out prevention ring 26 with the upper end thereof upwardly projecting from the bearing hole 23, thereby preventing them from coming out.

In this case, the wiper arm WA is connected to the projecting distal portion of the wiper pivot 4.

Here, the pivot holder 21 is integrally molded by use of a suitable synthetic resin material which has proper elasticity, that is, it typically differs in view of a kind of the material such as a metal member used in each of the aforementioned previous embodiments, and the bolt mounting hole 22a provided in the base portion 22 is formed in a taper shape such that the lower end side has a large diameter. In correspondence to this, a taper portion 51a in which the lower end side has a large diameter is formed at the lower side portion in the bolt 51, and the taper portion 51a is inserted to and engaged with the bolt mounting hole 22a. Further, each of the bolt mounting hole 22a and the taper portion 51a is formed in a non-circular shape having a cross section of a substantially common shape, and serves as a rotation preventing function.

Then, the bolt 51 is passed through and projected over the cowl top panel 50, and the nut 52 is meshed with the projecting distal portion, whereby the base portion 22 is fastened and fixed to the back surface of the cowl top panel 50 in an overlapping manner.

In this case, in accordance with this embodiment, the diameters of the bolt mounting hole 22a and the taper portion 51a of the bolt 51 are set, by taking a hardness of the synthetic resin material used for molding the pivot holder 21 into account, in such a manner that the bolt mounting hole 22a expands the diameter thereof and deforms due to its own elasticity against the taper portion 51a when the load having a value equal to or more than a predetermined value acts on the wiper pivot 4 from the upper side, thereby removing from the taper portion 51a.

In this case, in FIG. 16, reference numeral 32 denotes a spring washer and reference symbol B denotes a sealing boot attached so as to cover the arranging area such as the come-out prevention ring 26 and the like.

In accordance with this embodiment, in the case of employing the wiper unit to the vehicle of the concealed wiper type, since the rear distal portion of the engine hood 16 extends near the lower side portion of the front window panel (not shown), the upper portion of the wiper unit is covered with the rear distal portion of the engine hood 16, and the upper end of the wiper pivot 4 approaches the lower surface of the rear distal portion in the engine hood 16.

Here, when the collision load acts on the rear distal portion of the engine hood 16 from the upper portion at a time of a collision of the vehicle, the rear distal portion of the engine hood 16 deforms downward and interferes with the upper end of the wiper pivot 4.

And, when the collision load having a value equal to or more than a predetermined value acts on the wiper pivot 4 in the direction of the pivot axis from the upper portion, the tapered bolt mounting hole 22a of the base portion 22 in the pivot holder 21 is expanded and deformed by the taper portion 51a of the bolt 51, so that the base portion 22 removes from the taper portion 51a.

Accordingly, the pivot holder 21 removes and is apart from the lower surface of the cowl top panel 50, and the wiper pivot 4 enters downward, thereby making a deformation of the rear distal portion of the engine hood 16 to the lower side free.

As a result, the collapsing stroke of the rear distal portion of the engine hood 16 to the lower side can be increased, and the absorption characteristic of the collision energy can be improved.

As mentioned above, in accordance with this embodiment, since the tapered bolt mounting hole 22a in the base portion 22 of the pivot holder 21 is expanded and deformed by the taper portion 51*a* of the bolt 51 and the base portion 22 employs the structure of being released from the taper portion 51*a*, the structure of the wiper pivot 4 for entering downward can be made in simple.

Further, in accordance with this embodiment, the tapered bolt mounting hole 22*a* is elastically expanded and deformed by the taper portion 51*a* of the bolt 51 at a time when the pivot holder 21 removes from the cowl top panel 50 so as to be released from the taper portion 51*a*, thereby absorbing the collision energy, so that the absorption characteristic of the collision energy can be further improved.

Next, a twelfth embodiment in accordance with the present invention will be described below.

Figure 17:
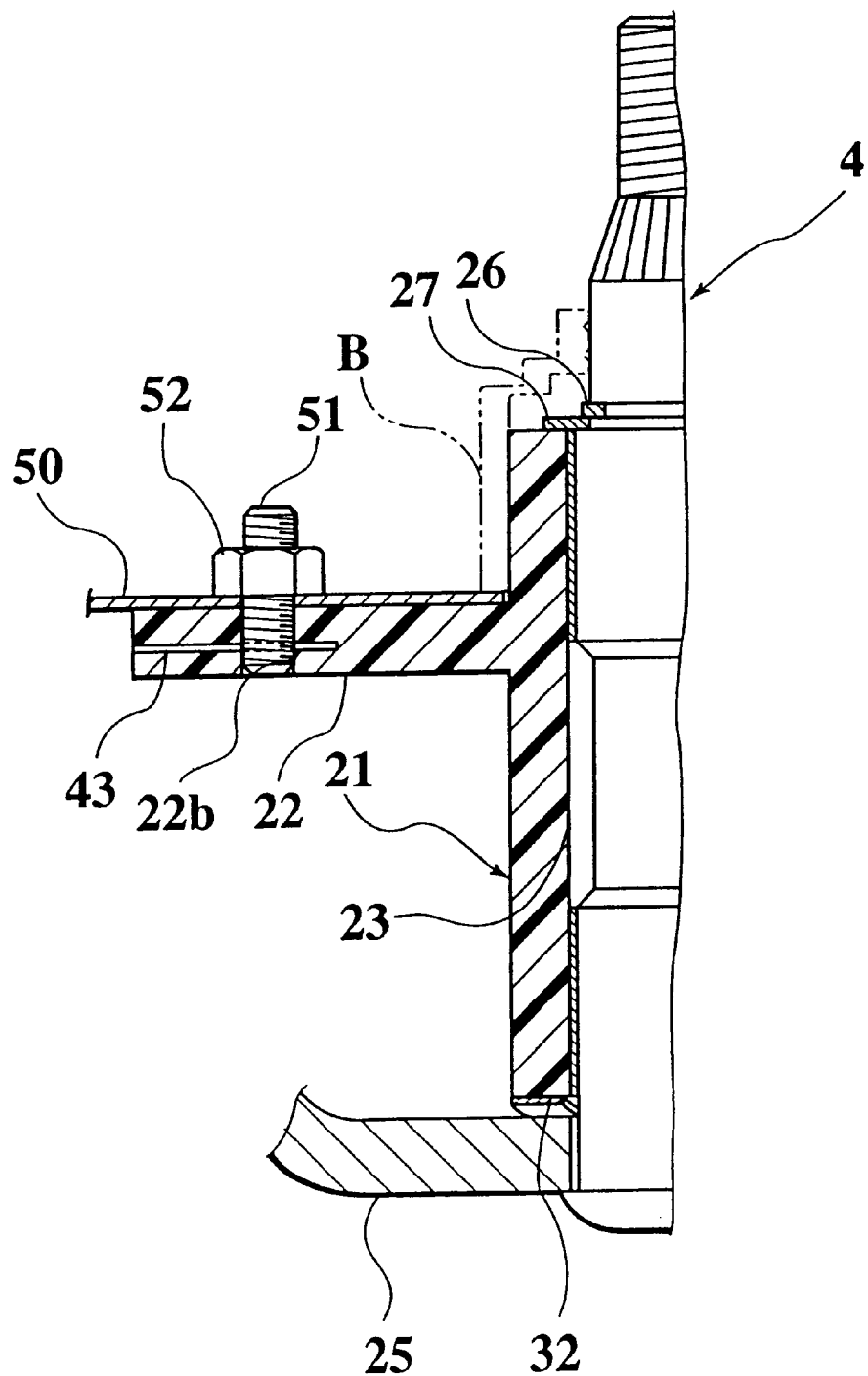
FIG. 17 is a cross sectional view which shows a state of mounting a pivot holder of a wiper unit to a vehicle body in accordance with a twelfth embodiment of the present invention.

As shown in FIG. 17, in accordance with this embodiment, the pivot holder 21 rotatably attaching the wiper pivot 4 to the bearing hole 23 is made of a synthetic resin, and the base portion 22 thereof is overlapped with the lower surface of the cowl top panel 50 and fastened and fixed by the bolt 51 and the nut 52. Accordingly, this embodiment is the same as the eleventh embodiment in view of the above point.

However, in accordance with this embodiment, the bolt mounting hole 22*b* of the base portion 22 and the lower side portion of the bolt 51 are formed in such a manner that both thereof has a circular cross section having a constant diameter, which is different from the first embodiment, and the bolt mounting hole 22*b* is formed so as to have a slightly smaller diameter than that of the bolt 51, thereby pressing and fitting the lower distal portion of the bolt 51 to the bolt mounting hole 22*b*.

Then, the base portion 22 and the bolt 51 are connected at a portion of the bolt mounting hole 22*b* by a shear pin 43, and are structured such that when the load having a value equal to or more than a predetermined value acts on the wiper pivot 4 along the pivot axis from the upper side, the shear pin 43 is sheared, so that the bolt mounting hole 22*b* removes from the lower distal portion of the bolt 51. In addition, the material of the pivot holder 21 is not limited to the synthetic resin, that is, such as a metal can be used, if it is sufficient that the shear pin 43 can be surely sheared.

In accordance with the embodiment mentioned above, when the collision load acts on the rear distal portion of the engine hood 16 from the upper side at a time of a collision of the vehicle or the like, the rear distal portion deforms downward and interferes with the upper end of the wiper pivot 4 and the collision load having a value equal to or more than a predetermined value acts on the wiper pivot 4 along the pivot axis from the upper side, the shear pin 43 is sheared and the bolt mounting hole 22*b* slides in a press contact state from the lower distal portion of the bolt 51 and released.

Accordingly, the wiper pivot 4 enters downward by the removing motion as well as the collision energy is absorbed by the shearing of the shear pin 43 and the frictional resistance at a time of removing the bolt mounting hole 22*b*, thereby increasing the collapsing stroke of the rear distal portion of the engine hood 16 to the lower side and improving the absorption characteristic for the collision energy.

As mentioned above, in accordance with this embodiment, the structure of the wiper pivot 4 for entering downward is made in simple by employing the structure that the shear pin 43 is sheared and the bolt mounting hole 22*b* is released from the lower distal portion of the bolt 51.

Next, a thirteenth embodiment in accordance with the present invention will be describe below.

Figure 18:
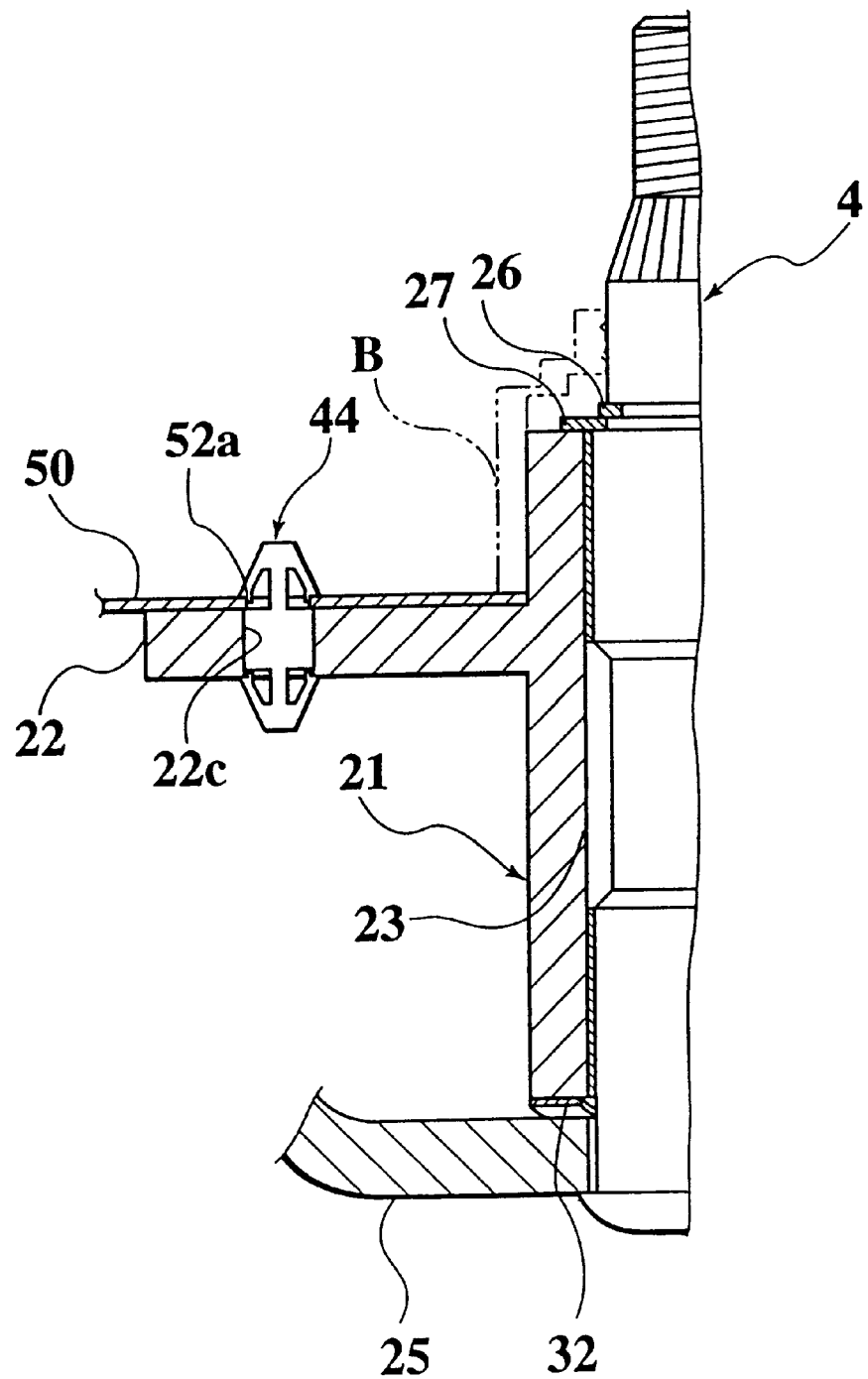
FIG. 18 is a cross sectional view which shows a state of mounting a pivot holder of a wiper unit to a vehicle body in accordance with a thirteenth embodiment of the present invention.

As shown in FIG. 18, in accordance with this embodiment, the structure is the same as that of the eleventh embodiment except that the base portion 22 of the pivot holder 21 is fastened and fixed to the cowl top panel 50 by using a clip 44 in place of being fastened and fixed by the bolt 51 and the nut 52.

Particularly speaking, the pivot holder 21 is made of a metal or a synthetic resin, a clip mounting hole 22*c* is provided at a base portion 22 thereof and a synthetic resin clip 44 having both heads is pressed and locked to the clip mounting hole 22*c*.

Then, the upper head portion of the clip 44 is pressed and inserted to a clip hole 50*a* in the cowl top panel 50 from the lower side so as to be locked, so that it is structured such that when the load having a value equal to or more than a predetermined value acts on the wiper pivot 4 along the pivot axis from the upper side, the upper or the lower head portion of the clip 44 is broken and is released from the clip hole 50*a* or the clip mounting hole 22*c*.

In accordance with the embodiment mentioned above, when the collision load acts on the rear distal portion of the engine hood 16 from the upper side at a time of a collision of the vehicle, the rear distal portion deforms downward and interferes with the upper end of the wiper pivot 4, and the collision load having a value equal to or more than a predetermined value acts on the wiper pivot 4 along the pivot axis from the upper portion, the upper or the lower head portion of the clip 44 is broken correspondingly by an edge of the clip hole 50*a* or an edge of the clip mounting hole 22*c*, so that the clip 44 is released.

Accordingly, the wiper pivot 4 enters downward by a removing motion of the clip 44 as well as the collision energy is absorbed by breaking of the head portion of the clip 44 mentioned above, so that the collapsing stroke of the rear distal portion of the engine hood 16 to the lower portion can be increased, and the absorption characteristic of the collision energy can be improved. Of course, both of the head portions may be simultaneously broken.

As mentioned above, in accordance with this embodiment, the structure of the wiper pivot 4 for entering downward can be made in simple by employing the structure in which the head portion of the clip 44 is broken.

Next, a fourteenth embodiment in accordance with the present invention will be described below.

In accordance with this embodiment, the clip 44 in the thirteenth embodiment is integrally formed with the base portion 22 of the pivot holder 21, and the other points are the same as those of the thirteenth embodiment.

Figure 19:
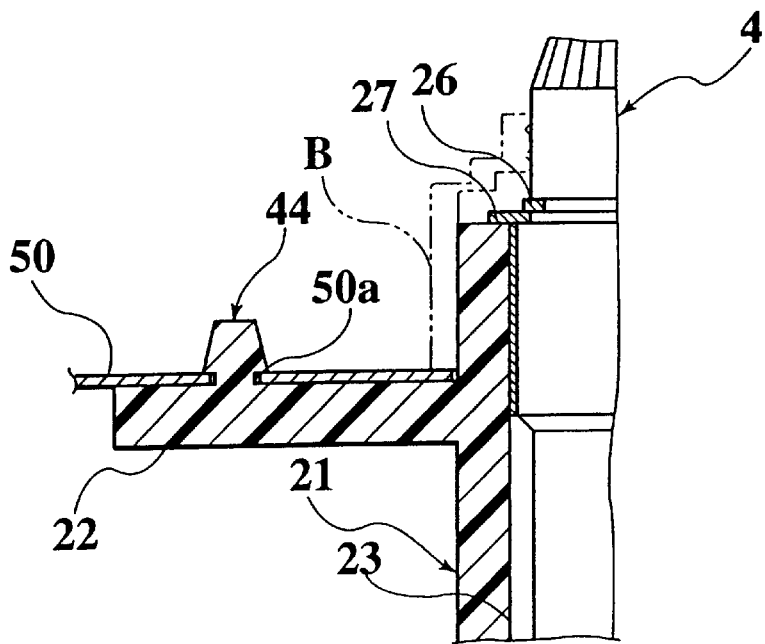
FIG. 19 is a cross sectional view which shows a state of mounting a pivot holder of a wiper unit to a vehicle body in accordance with a fourteenth embodiment of the present invention.
Figure 20:
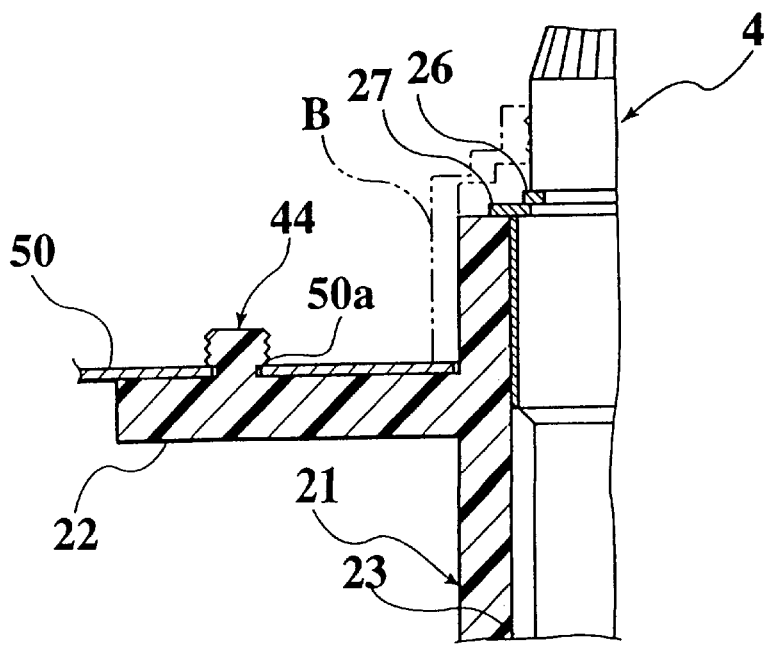
FIG. 20 is a cross sectional view which shows a state of mounting a pivot holder of a wiper unit to a vehicle body in accordance with the fourteenth embodiment of the present invention.

Particularly speaking, the pivot holder 21 is made of a synthetic resin, and as shown in FIGS. 19 and 20, the clip 44 is integrally formed with the base portion 22.

And more particularly. a shape of the head portion of the clip 44 is formed in a sagittate shape as shown in FIG. 19 or in a saw tooth shape as shown in FIG. 20, and an operation of this embodiment is the same as that of the thirteenth embodiment.

Next, a fifteenth embodiment in accordance with the present invention will be described below.

Figure 21:
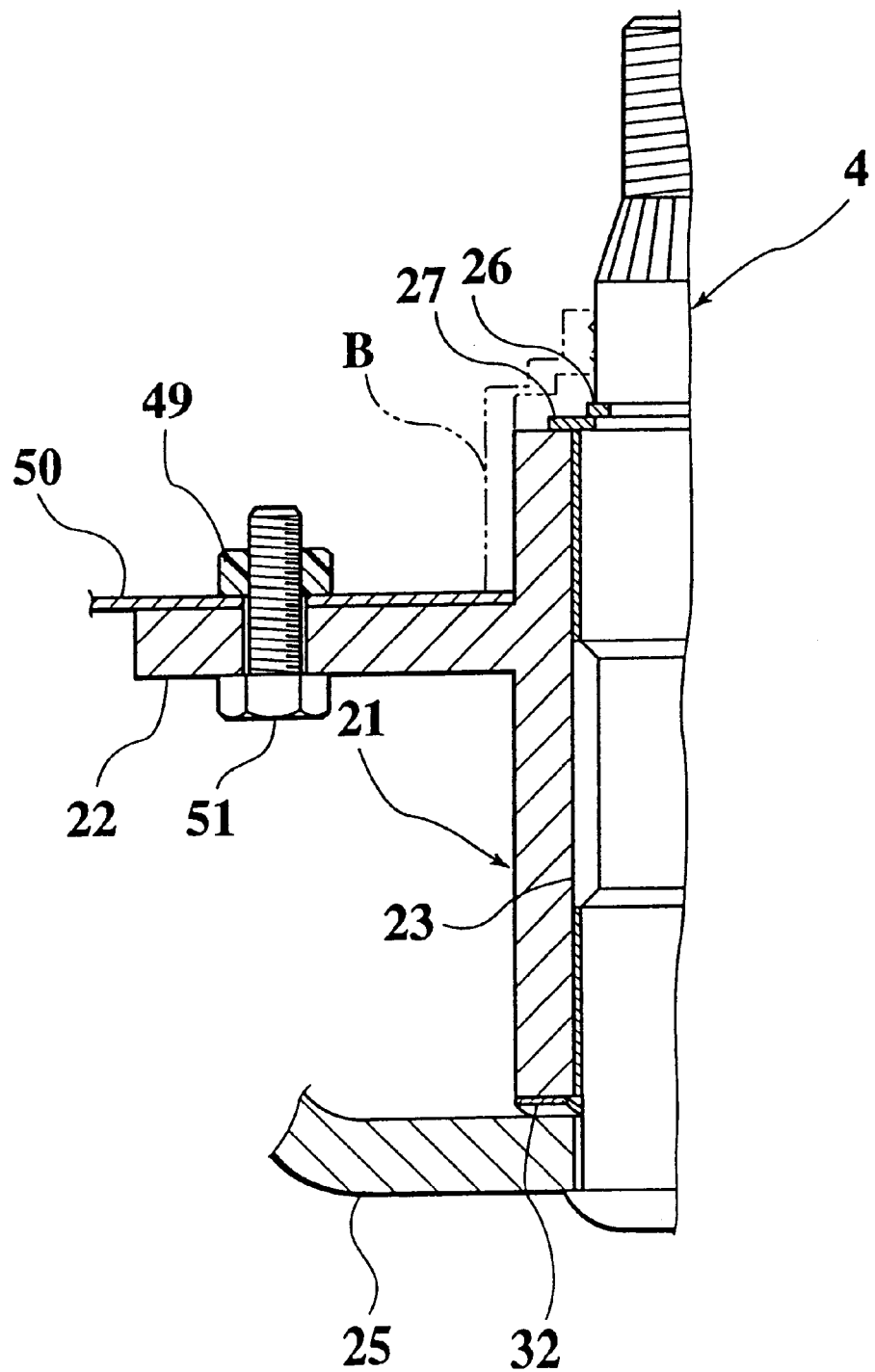
FIG. 21 is a cross sectional view which shows a state of mounting a pivot holder of a wiper unit to a vehicle body in accordance with a fifteenth embodiment of the present invention.

As shown in FIG. 21, in accordance with this embodiment, the base portion 22 in the pivot holder 21 rotatably attaching the wiper pivot 4 to the bearing hole 23 is overlapped with the lower surface of the cowl top panel 50 and fastened and fixed by the bolt and the nut. Accordingly, this embodiment is the same as the eleventh embodiment in view of the above point.

More particularly speaking, the bolt 51 is fixed and provided in the base portion 22 of the pivot holder 21, the upper distal portion of the bolt 51 is extended and projected over the cowl top panel 50, and the nut 49 made by a suitable synthetic resin is meshed with the projecting distal portion of the bolt 51, thereby being fastened such that the bolt 51 can remove from the resin nut 49 with respect to the load having a value equal to or more than a predetermined value acting on the wiper pivot 4 along the pivot axis from the upper side. In addition, the material of the pivot holder 21 is a metal in this embodiment, however, it is not limited to the metal, that is, such as a synthetic resin can be used, if it is sufficient that the bolt 51 can be surely removed.

In accordance with the embodiment mentioned above, when the load having a value equal to or more than a predetermined value acts on the wiper pivot 4 through the rear distal portion of the engine hood 16 from the upper side at a time of a collision of the vehicle, the bolt 51 breaks the screw portion of the resin nut 49 and the bolt 51 is released.

Accordingly, the wiper pivot 4 enters downward by the removing motion of the bolt 49 as well as the collision energy is absorbed by the breaking of the screw portion in the resin nut 49, thereby increasing the collapsing stroke of the rear distal portion of the engine hood 16 to the lower side and improving the absorption characteristic for the collision energy.

As mentioned above, in accordance with this embodiment, the structure of the wiper pivot 4 for entering downward is made in simple by employing the structure that the resin nut 49 is broken.

Next, a sixteenth embodiment in accordance with the present invention will be described below.

Figure 22:
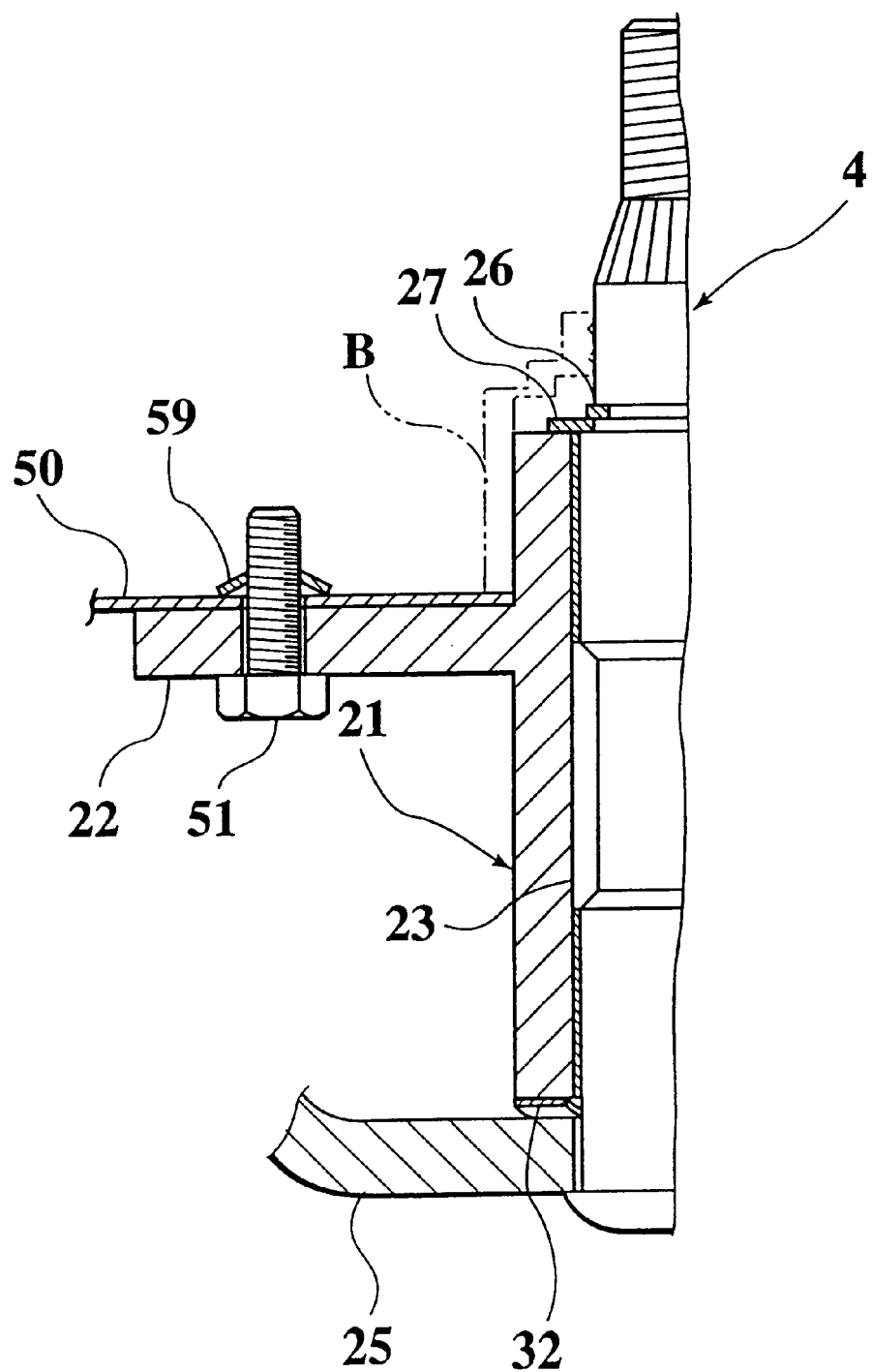
FIG. 22 is a cross sectional view which shows a state of mounting a pivot holder of a wiper unit to a vehicle body in accordance with a sixteenth embodiment of the present invention.

As shown in FIG. 22, in accordance with this embodiment, a push nut 59 made of a suitable synthetic resin material is locked at a projecting distal portion of the bolt 51 in place of the resin nut 49 in the fifteenth embodiment, and the other points are the same as those of the fifteenth embodiment.

Accordingly, in accordance with this embodiment, the push nut 59 is broken, whereby the structure of the wiper pivot 4 for entering downward can be made in simple.

Next, a seventeenth embodiment in accordance with the present invention will be described below.

Figure 23:
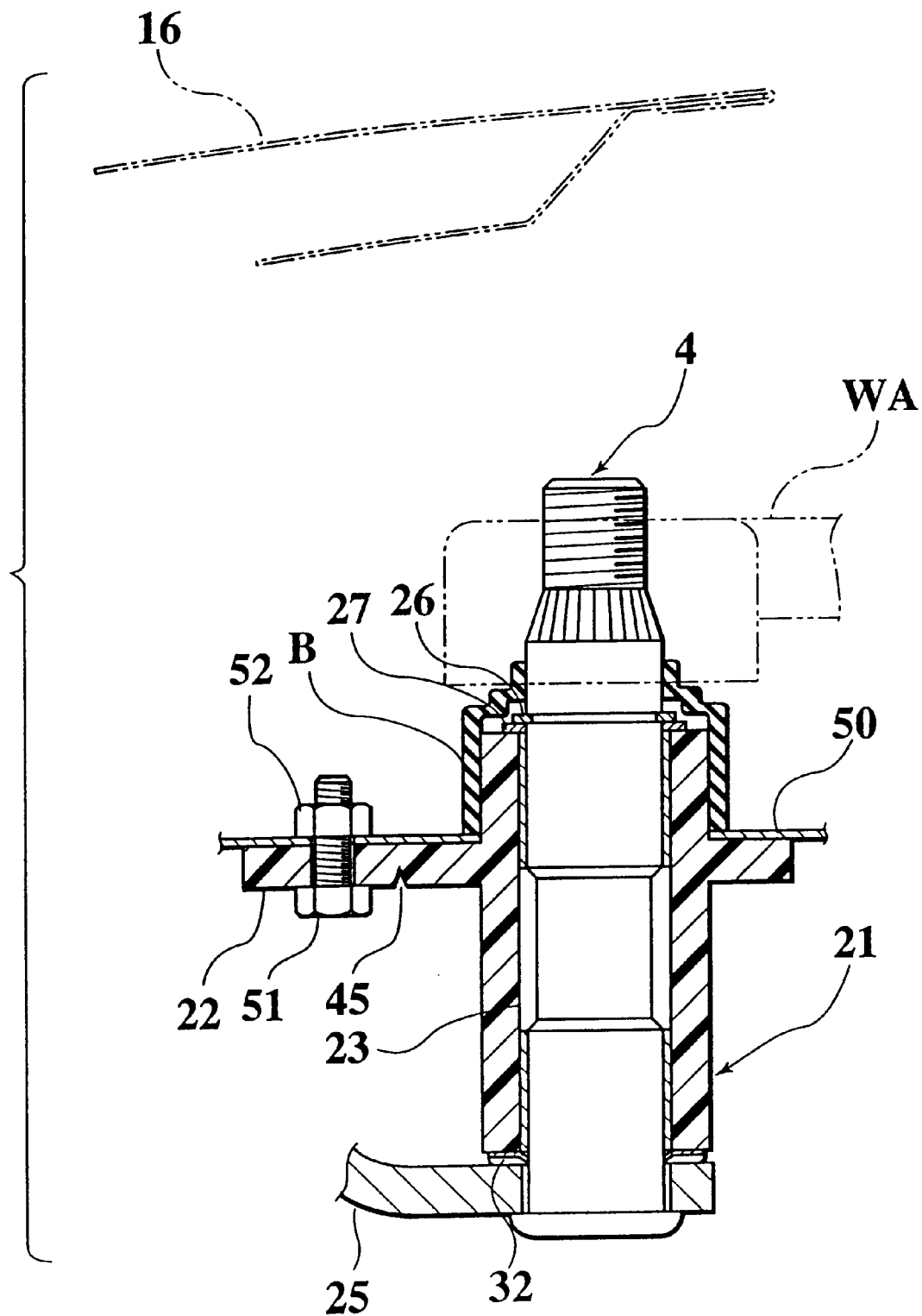
FIG. 23 is a cross sectional view which shows a state of mounting a pivot holder of a wiper unit to a vehicle body in accordance with a seventeenth embodiment of the present invention.
Figure 24:
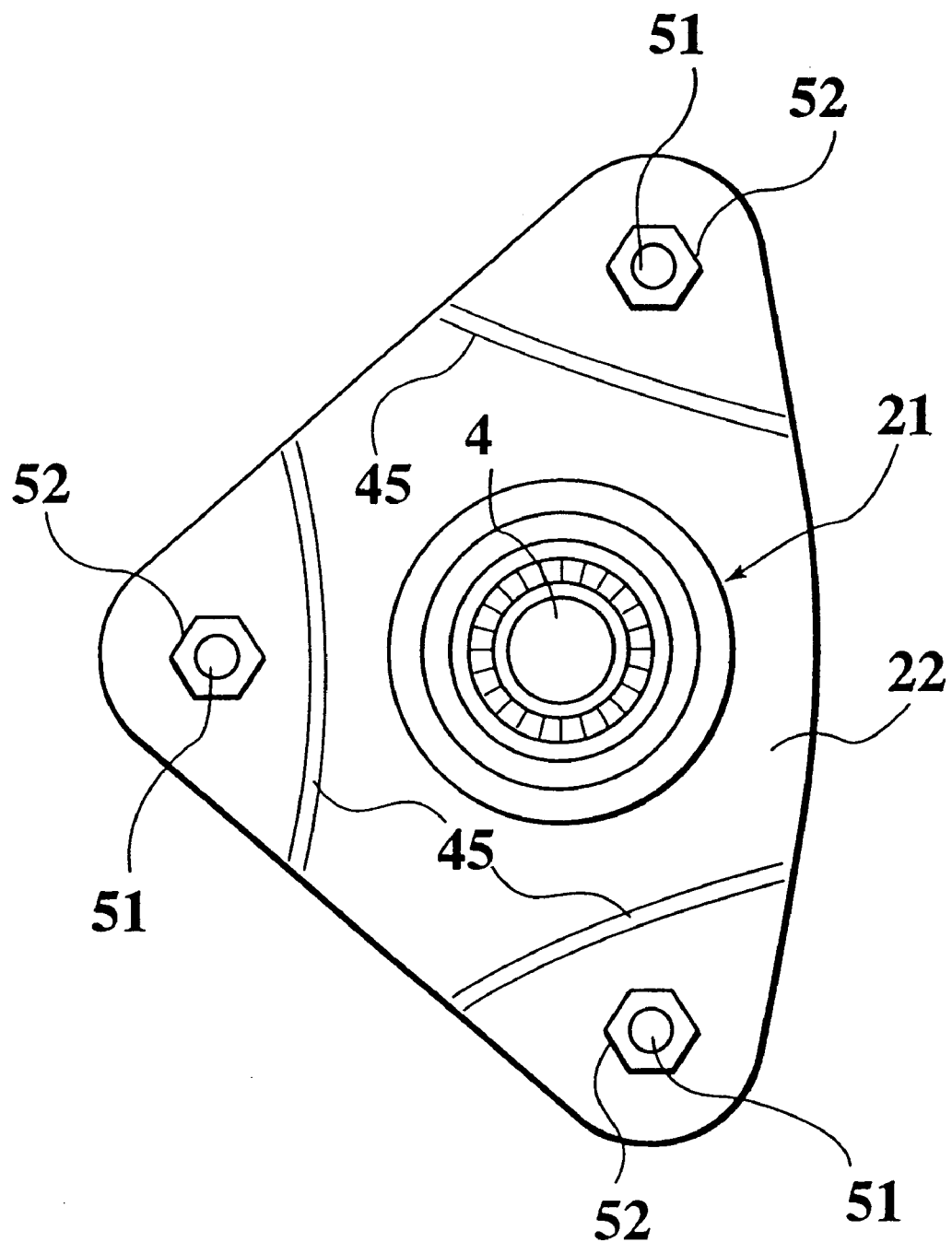
FIG. 24 is a plan view of the pivot holder of the wiper unit of the wiper device in accordance with a seventeenth embodiment of the present invention.

As shown in FIGS. 23 and 24, in accordance with this embodiment, the pivot holder 21 of the wiper unit is structured in the same manner as that of the eleventh embodiment in accordance with the present invention such that the base portion 22 is overlapped with the vehicle body panel, for example, the back surface of the cowl top panel 50 and fastened and fixed to the cowl top panel 50 by the bolt 51 and the nut 52. In this embodiment, as an example, the base portion 22 is fasten and fixed by three pairs of bolts and nuts.

However, in accordance with this embodiment, in place of the structure employed in the eleventh embodiment in which the taper portion having the lower end side with a large diameter is formed in the lower side portion of the bolt 51 and the taper portion is inserted to and engaged with the tapered bolt mounting hole 22a, easily breaking portions 45 are provided in the base portion 22 of the pivot holder 21. In this case, the pivot holder 21 is made of a synthetic resin, but a metal having the substantially similar mechanical characteristic can be used.

Particularly speaking, in accordance with this embodiment, in the base portion 22 of the pivot holder 21 overlapped with the lower surface of the cowl top panel 50 and fastened and fixed by the bolt 51 and the nut 52, each of the easily breaking portions 45 capable of breaking against the load having a value equal to or more than a predetermined value acting on the wiper pivot 4 along the pivot axis from the upper side is provided in the portion inside the fastened portion by the bolt 51 and the nut 52 of the base portion 22.

Each of the easily breaking portions 45 is formed by providing a notch extending along a slightly curved line so as to section the fastened portion on the lower surface side of the base portion 22, thereby forming a thin portion.

In accordance with the embodiment mentioned above, when the load having a value equal to or more than a predetermined value acts on the wiper pivot 4 through the rear distal portion of the engine hood 16 along the pivot axis from the upper side at a time of a collision of the vehicle, the base portion 22 of the pivot holder 21 breaks from the easily breaking portions 45 and removes from the cowl top panel 50 while remaining the portions fastened by the bolt 51 and the nut 52.

Accordingly, the wiper pivot 4 enters downward by the removing motion of the base portion 22 as well as the collision energy is absorbed by the breaking of the easily breaking portions 45, thereby increasing the collapsing stroke of the rear distal portion of the engine hood 16 to the lower side and improving the absorption characteristic for the collision energy.

In this case, an absorbing amount of the collision energy due to the breaking of the easily breaking portions 45 can be optionally tuned by selecting a material of the pivot holder 21 and notch depth of each of the easily breaking portions 45.

As mentioned above, in accordance with this embodiment, the structure of the wiper pivot 4 for entering downward is made in simple by employing the structure that the easily breaking portions 45 are broken.

Next, an eighteenth embodiment in accordance with the present invention will be described below.

Figure 25:
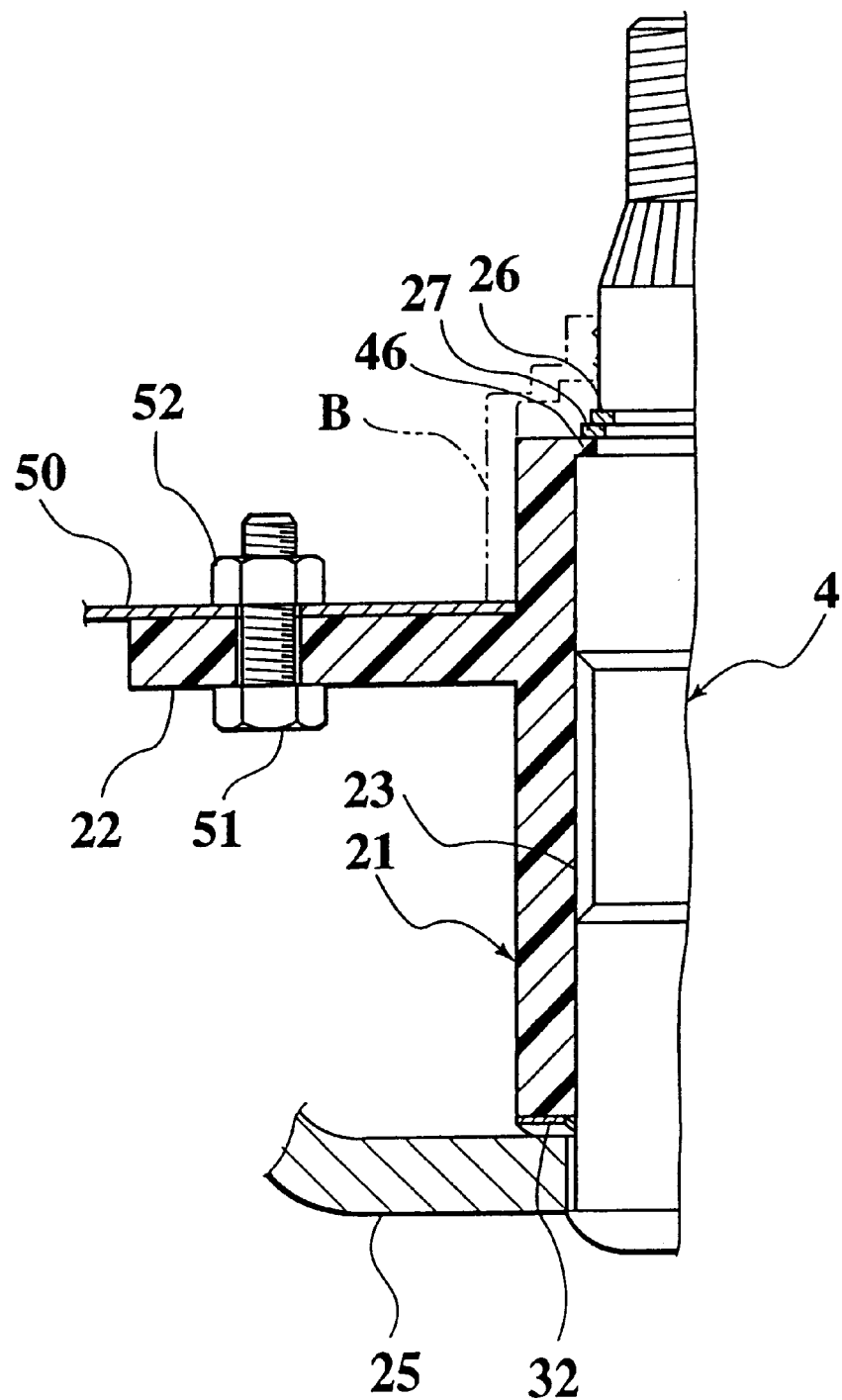
FIG. 25 is a cross sectional view which shows a state of mounting a pivot holder of a wiper unit to a vehicle body in accordance with an eighteenth embodiment of the present invention.

As shown in FIG. 25, also in accordance with this embodiment, the pivot holder 21 of the wiper pivot is structured in the same manner as that of the eleventh embodiment such that the base portion 22 is overlapped with the vehicle body panel, for example, the back surface of the cowl top panel 50 and fastened and fixed to the cowl top panel 50 by means of the bolt 51 and the nut 52.

However, in accordance with this embodiment, in place of the structure employed in the eleventh embodiment in which the taper portion having the lower end side with a large diameter is formed in the lower side portion of the bolt 51 and the taper portion is inserted to and engaged with the tapered bolt mounting hole 22a, a flange portion 46 is provided at an inner peripheral edge in the upper portion of the bearing hole 23 in the pivot holder 21.

Particularly speaking, as shown in FIG. 25, in accordance with this embodiment, the structure in which the pivot holder 21 is made of a synthetic resin and the flange portion 46 is integrally formed so as to inwardly project at the inner peripheral edge of the upper portion in the bearing hole 23 is employed. In this case, the pivot holder 21 is made of a synthetic resin, but a metal having the substantially similar mechanical characteristic can be used.

Then, the plain washer 27 preventing the wiper pivot 4 from coming out is engaged with the upper edge of the flange portion 46, that is, the come-out prevention is structured such that when the load having a value equal to or more than a predetermined value acts on the wiper pivot 4 along the pivot axis from the upper side, an outer peripheral edge of the plain washer 27 shears the flange portion 46, so that the wiper pivot 4 can be released.

In accordance with the embodiment mentioned above, when the load having a value equal to or more than a predetermined value acts on the wiper pivot 4 through the rear distal portion of the engine hood 16 in the pivot axis from the upper side at a time of a collision of the vehicle, the outer peripheral edge of the plain washer 27 preventing the wiper pivot 4 from coming out shears the flange portion 46.

Accordingly, the wiper pivot 4 enters downward by the removing motion from the wiper pivot 21, changed from the come-out prevention state, as well as the collision energy is absorbed by the shearing of the flange portion 46, thereby increasing the collapsing stroke of the rear distal portion of the engine hood 16 to the lower side and improving the absorption characteristic for the collision energy.

As mentioned above, in accordance with this embodiment, the structure of the wiper pivot 4 for entering downward is made in simple by employing the structure that the flange portion 46 is sheared.

Next, a nineteenth embodiment in accordance with the present invention will be described below.

Figure 26:
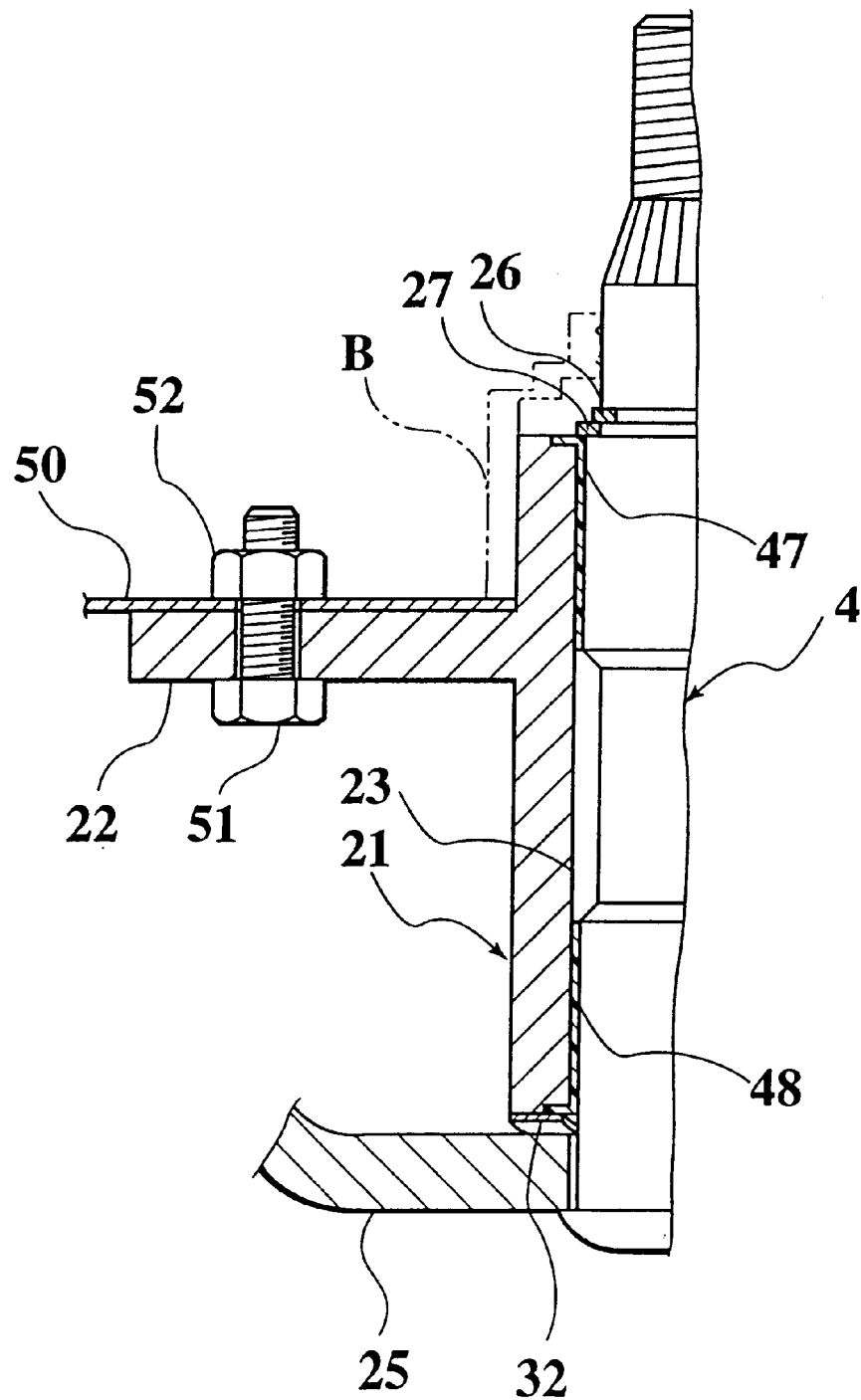
FIG. 26 is a cross sectional view which shows a state of mounting a pivot holder of a wiper unit to a vehicle body in accordance with a nineteenth embodiment of the present invention.

As shown in FIG. 26, also in accordance with this embodiment, the pivot holder 21 of the wiper pivot is structured in the same manner as that of the eleventh embodiment such that the base portion 22 is overlapped with the vehicle body panel, for example, the back surface of the cowl top panel 50 and fastened and fixed to the cowl top panel 50 by means of the bolt 51 and the nut 52.

However, in accordance with this embodiment, in place of the structure employed in the eleventh embodiment in which the taper portion having the lower end side with a large diameter is formed in the lower side portion of the bolt 51 and the taper portion is inserted to and engaged with the tapered bolt mounting hole 22a, bushes 47 and 48 are respectively fitted and fixed to upper and lower distal portions of the bearing hole 23 in the pivot holder 21. In this case, the pivot holder 21 may be made of either a synthetic resin or a metal.

Particularly speaking, the structure is made such that the bushes 47 and 48 are fitted and fixed to the upper and lower distal portions of the bearing hole 23 in the pivot holder 21 and the wiper pivot 4 is supported in a freely rotatable manner by means of the bushes 47 and 48.

More particularly speaking, the come-out preventing structure is made such that at least the bush 47 at the upper side is made of a synthetic resin, the plain washer 27 for preventing the wiper pivot 4 from coming out is engaged with the inner peripheral edge of the upper end in the bush 47, and the outer peripheral edge of the plain washer 27 presses and breaks the inner peripheral portion of the bush 47 when the load having a value equal to or more than a predetermined value acts on the wiper pivot 4 along the pivot axis from the upper side so that the wiper pivot 4 can be released.

In accordance with the embodiment mentioned above, when the load having a value equal to or more than a predetermined value acts on the wiper pivot 4 through the rear distal portion of the engine hood 16 along the pivot axis from the upper side at a time of a collision of the vehicle, the outer peripheral edge of the plain washer 27 preventing the wiper pivot 4 from coming out cuts out the inner peripheral portion of the bush 47 so that the bush 47 is pressed and broken.

Accordingly, the wiper pivot 4 enters downward by the removing motion from the pivot holder 21, changed from the come-out prevention state, as well as the collision energy is absorbed by the pressing and breaking of the inner peripheral portion in the bush 47, thereby increasing the collapsing stroke of the rear distal portion of the engine hood 16 to the lower side and improving the absorption characteristic for the collision energy.

As mentioned above, in accordance with this embodiment, the structure of the wiper pivot 4 for entering downward is made in simple by employing the structure that the bush 47 is pressed and broken.

Last, a twentieth embodiment in accordance with the present invention will be described below.

Figure 28:
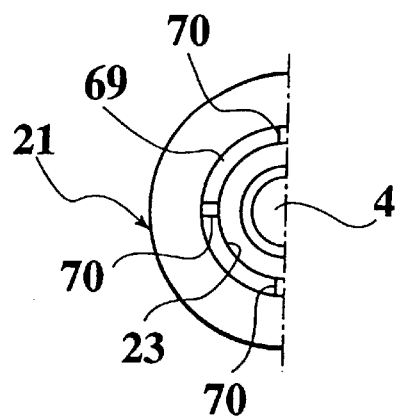
FIG. 28 is a plan view of a main portion in FIG. 27.
Figure 27:
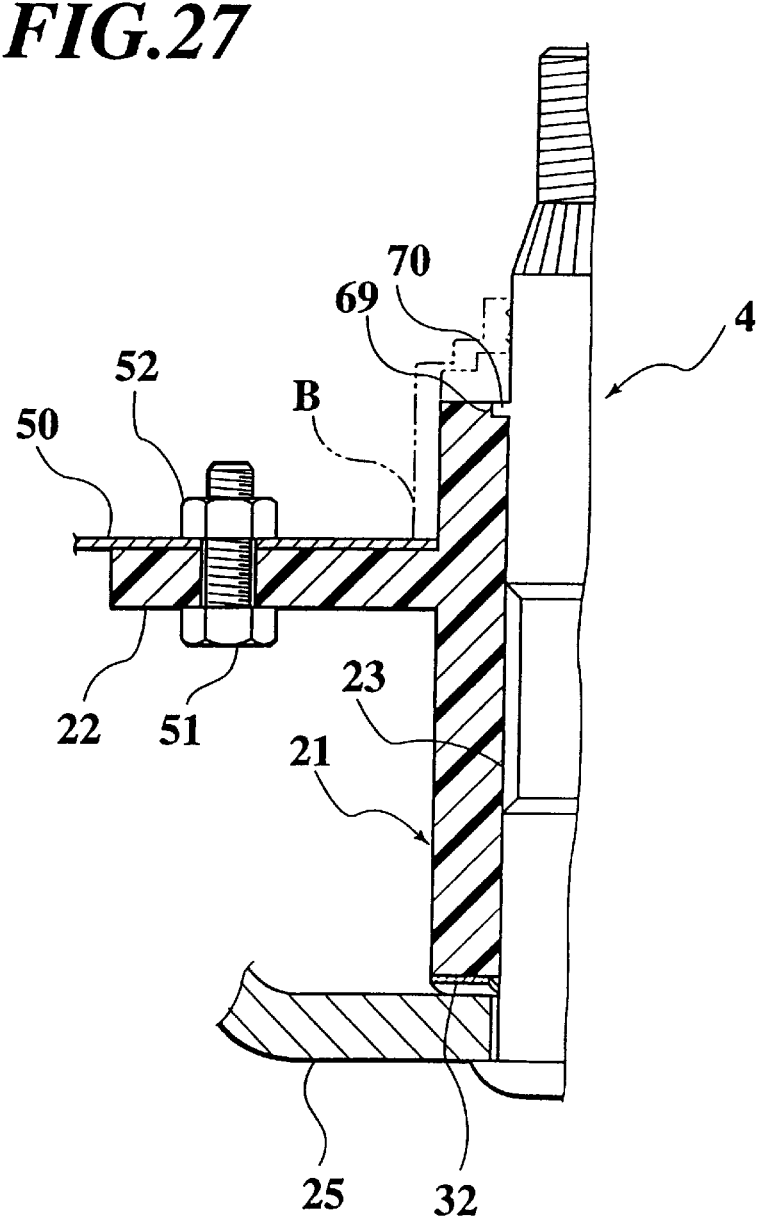
FIG. 27 is a cross sectional view which shows a state of mounting a pivot holder of a wiper unit to, a vehicle body in accordance with a twentieth embodiment of the present invention.

As shown in FIGS. 27 and 28, also in accordance with this embodiment, the pivot holder 21 of the wiper pivot is structured in the same manner as that of the eleventh embodiment such that the base portion 22 is overlapped with the vehicle body panel, for example, the back surface of the cowl top panel 50 and fastened and fixed to the cowl top panel 50 by means of the bolt 51 and the nut 52.

However, in accordance with this embodiment, in place of the structure employed in the eleventh embodiment in which the taper portion having the lower end side with a large diameter is formed in the lower side portion of the bolt 51 and the taper portion is inserted to and engaged with the tapered bolt mounting hole 22a, an annular groove 69 is provided at an inner peripheral edge in the upper portion of the bearing hole 23 in the pivot holder 21. In this case, the pivot holder 21 is made of a synthetic resin, but a metal having the substantially similar mechanical characteristic can be used.

Particularly speaking, the pivot holder 21 is made of a synthetic resin and the annular groove 69 is formed on the inner peripheral edge of the upper end in the bearing hole 23 in a step manner.

Then, a plurality of projections 70 are provided in a projecting manner on an outer periphery of the upper side portion in the wiper pivot 4, and the come-out preventing structure is made such that when the load having a value equal to or more than a predetermined value acts on the wiper pivot 4 along the pivot axis from the upper side by engaging the projections 70 with the annular groove 69, so that the projections 70 press and break the inner peripheral portion of the bearing hole 23, thereby releasing the wiper pivot 4.

In accordance with the embodiment mentioned above, when the load having a value equal to or more than a predetermined value acts on the wiper pivot 4 through the rear distal portion of the engine hood 16 from the upper side at a time of a collision of the vehicle, the projections 70 preventing the wiper pivot 4 from coming out press and break such as to cut out the inner peripheral portion of the bearing hole 23 from the engaging portion with the annular groove 69.

Accordingly, the wiper pivot 4 enters downward by the removing motion from the pivot holder 21, changed from the come-out prevention state, as well as the collision energy is absorbed by the pressing and breaking of the inner peripheral portion of the bearing hole 23, thereby increasing the collapsing stroke of the rear distal portion of the engine hood to the lower portion and improving the absorption characteristic for the collision energy.

As mentioned above, in accordance with this embodiment, the structure of the wiper pivot 4 for entering downward is made in simple by employing the structure that the inner peripheral portion of the bearing hole 23 is pressed and broken.

Further, in accordance with this embodiment, since the wiper pivot 4 is prevented from coming out by an engagement between the outer peripheral projections 70 and the annular groove 69 in the bearing hole 23, and an exclusive come-out preventing member is not required, it is costly advantageous.

What is claimed is:

1. A wiper device for a vehicle having a vehicle body, comprising:
   a wiper motor;
   a wiper pivot operatively connected to said wiper motor;
   a pivot holder which supports said wiper pivot so that it projects out of the vehicle body and so that it can rotate about the pivot axis in response to the transmission of a drive force thereto from said wiper motor;
   a partially destructible position maintaining structure which prevents axial displacement between said wiper pivot and said pivot holder until a predetermined load is applied to said wiper pivot and the wiper pivot is permitted to move relative to said pivot holder to an inner side of the vehicle body; and
   wherein said position maintaining structure comprises:
      a groove portion formed in said wiper pivot,
      a first engaging piece, and
      a second engaging piece, the first engaging piece comprising:
         a breakable member which is disposed with the wiper pivot, which has a predetermined structural resistance to breakage that is lower than the second engaging piece, and which breaks upon the application of the predetermined load, and wherein the second engaging piece comprises:
            a connection member which snugly engages in the groove formed in the wiper pivot and engages the first engaging piece and prevents axial displacement of the wiper pivot with respect to the pivot holder until the first engaging piece breaks under the application of the predetermined load.

2. A wiper device for a vehicle according to claim 1, wherein said wiper pivot is concealed behind a hood member forming part of the vehicle body, and wherein the predetermined load is applied to said wiper pivot by the hood member in response to deformation of the hood member.

3. A wiper device for a vehicle according to claim 1, wherein the breakable member comprises a plain washer which is formed of a brittle material having a high rigidity.

4. A wiper device for a vehicle according to claim 3, wherein the brittle, high rigidity material is one of a fiber reinforced resin, a light metal and a die cast material.

* * * * *